US008856169B2

(12) United States Patent
Zhang et al.

(10) Patent No.: US 8,856,169 B2
(45) Date of Patent: Oct. 7, 2014

(54) MULTI-MODALITY, MULTI-RESOURCE, INFORMATION INTEGRATION ENVIRONMENT

(75) Inventors: Guo-Qiang Zhang, Orange, OH (US); Remo Sebastian Wolfgang Mueller, Cambridge, MA (US); Jacek Szymanski, Brooklyn, OH (US); Adam Troy, Bothell, WA (US); David L. Wilson, Cleveland Heights, OH (US); Chris A. Flask, Avon Lake, OH (US); Raymond F. Muzic, Jr., Mentor, OH (US)

(73) Assignee: Case Western Reserve University, Cleveland, OH (US)

( * ) Notice: Subject to any disclaimer, the term of this patent is extended or adjusted under 35 U.S.C. 154(b) by 71 days.

(21) Appl. No.: 13/548,752

(22) Filed: Jul. 13, 2012

(65) Prior Publication Data
US 2013/0091170 A1 Apr. 11, 2013

Related U.S. Application Data

(60) Provisional application No. 61/507,408, filed on Jul. 13, 2011.

(51) Int. Cl.
*G06F 17/30* (2006.01)
*G06F 21/30* (2013.01)

(52) U.S. Cl.
CPC .................................... *G06F 21/30* (2013.01)
USPC ........... 707/769; 707/772; 707/770; 707/783; 707/784; 707/709; 705/2; 705/3; 706/47; 706/50

(58) Field of Classification Search
CPC .................... G06F 17/30643; G06F 17/30873; G06F 19/32; G06F 19/3487
USPC ................ 707/622, 732–734, 783–784, 941; 705/2, 3; 706/47, 50
See application file for complete search history.

(56) References Cited

U.S. PATENT DOCUMENTS

| | | | |
|---|---|---|---|
| 7,006,881 B1 * | 2/2006 | Hoffberg et al. ................ 700/83 |
| 7,054,823 B1 * | 5/2006 | Briegs et al. ..................... 705/2 |
| 7,493,265 B2 * | 2/2009 | Fagan et al. ...................... 705/3 |
| 8,332,517 B2 * | 12/2012 | Russell .......................... 709/226 |
| 8,516,266 B2 * | 8/2013 | Hoffberg et al. .............. 713/189 |
| 2002/0007294 A1 * | 1/2002 | Bradbury et al. ................. 705/7 |

(Continued)

OTHER PUBLICATIONS

Szymanski, Jacek, Troy, Adam, Zhang, Q-Q, MIMI: Integrated Multi-modality Information Management for Biomedical Cores, Case Western Reserve University, p. 1.

(Continued)

*Primary Examiner* — Frantz Coby
(74) *Attorney, Agent, or Firm* — McDonald Hopkins LLC

(57) ABSTRACT

A multi-modality, multi-resource, information integration environment system is disclosed that comprises: (a) at least one computer readable medium capable of securely storing and archiving system data; (b) at least one computer system, or program thereon, designed to permit and facilitate web-based access of the at least one computer readable medium containing the secured and archived system data; (c) at least one computer system, or program thereon, designed to permit and facilitate resource scheduling or management; (d) at least one computer system, or program thereon, designed to monitor the overall resource usage of a core facility; and (e) at least one computer system, or program thereon, designed to track regulatory and operational qualifications.

28 Claims, 12 Drawing Sheets

(56) References Cited

U.S. PATENT DOCUMENTS

| | | | |
|---|---|---|---|
| 2006/0184493 A1* | 8/2006 | Shiffman et al. | 706/47 |
| 2008/0133270 A1* | 6/2008 | Michelson et al. | 705/2 |
| 2010/0228699 A1* | 9/2010 | Webber et al. | 707/622 |
| 2011/0225114 A1* | 9/2011 | Gotthardt | 706/50 |
| 2013/0185096 A1* | 7/2013 | Giusti et al. | 705/3 |
| 2013/0304878 A1* | 11/2013 | Russell | 709/220 |
| 2014/0089241 A1* | 3/2014 | Hoffberg et al. | 706/14 |

OTHER PUBLICATIONS

Mueller, Remo, Tran, Van Anh, Zhang, Guo-Qiang, A Scalable Parametric-RBAC Architecture, Case Western Reserve University, p. 1.

Sandberg, Neil, Implementation of the Clinical Research Query Interface Visage, May 2010, pp. 1-138, Case Western Reserve University.

Mueller, Remo, Sahoo, Satya, Dong, Xiao, Redline, Susan, Arabandi, Sivaram, Luo, Lingyun, Zhang, GQ, Mapping multi-institution data sources to domain ontology for data federation: the PhysioMIMI approach, pp. 1-2, Division of Medical Informatics, Case Western Reserve University, Division of Sleep Medicine, Harvard University.

Mueller, Remo Sebastian, Ontology-Driven Data Integration for Clinical Sleep Research, pp. 1-196, Case Western Reserve University.

Zhang, GQ, Mueller, Remo, Johnson, Nate, Luo, L., Dong, Xiao, Redline, Susan, Sahoo, Satya; pp. 1-2, Division of Medical Informatics, Case Western Reserve University, Division of Sleep Medicine, Harvard University.

Szymanski, Jacek, An Integrated Data Management System for Biomedical Core Facilities, Jul. 27, 2006, pp. 1-20, Case Western Reserve University.

\* cited by examiner

| Query | VISAGE | | i2b2 Web Client | |
|---|---|---|---|---|
| | # of clicks | time (sec.) | clicks | time (sec.) |
| 1 | 5 | 13 | 14 | 59 |
| 2 | 6 | 16 | 25 | 119 |
| 3 | 20 | 52 | 37 | 160 |

FIGURE 9

```
<div url="/users/search" update="user_search"
  method="post" class="pagination">
  <a onclick="showLoading(); new Ajax.Updater('user_search',
      '/users/search?authenticity_token=AXgKRqNj&page=1&search↵
        =',
      {asynchronous:true, evalScripts:true, method:'post',
      onComplete:function(request){hideLoading()},
      parameters:'authenticity_token='+encodeURIComponent('↵
        AXgKRqNj')});
      return false;" href="#">1</a>
  <a onclick="showLoading(); new Ajax.Updater('user_search',
      '/users/search?authenticity_token=AXgKRqNj&page=2&search↵
        =',
      {asynchronous:true, evalScripts:true, method:'post',
      onComplete:function(request){hideLoading()},
      parameters:'authenticity_token='+encodeURIComponent('↵
        AXgKRqNj')});
      return false;" href="#">2</a>
  <a onclick="showLoading(); new Ajax.Updater('user_search',
      '/users/search?authenticity_token=AXgKRqNj&page=3&search↵
        =',
      {asynchronous:true, evalScripts:true, method:'post',
      onComplete:function(request){hideLoading()},
      parameters:'authenticity_token='+encodeURIComponent('↵
        AXgKRqNj')});
      return false;" href="#">3</a>
</div>
```

HTML files using unobtrusive JavaScript:

```
<div class="pagination ajax">
  <a href="/users/search?page=1">1</a>
  <a href="/users/search?page=2">2</a>
  <a href="/users/search?page=3">3</a>
</div>
```

JS File:

```
document.observe("dom:loaded", function() {
  var container = $(document.body)
  if (container) {
    container.observe('click', function(e) {
      var el = e.element()
      if (el.match('.pagination.ajax a')) {
        new Ajax.Request(el.href, {method: 'post', parameters: $('search-form').serialize() })
        e.stop()
      }
    })
  }
})
```

FIGURE 12

MULTI-MODALITY, MULTI-RESOURCE, INFORMATION INTEGRATION ENVIRONMENT

RELATED APPLICATION DATA

The present application is a claims priority to U.S. Provisional Patent Application No. 61/507,408, filed Jul. 13, 2011, the entirety of which is hereby incorporated by reference in its entirety herein.

FIELD OF THE INVENTION

This application relates to a multi-modality, multi-resource, information integration environment.

BACKGROUND OF THE INVENTION

Modern biomedical research is inherently multi-leveled and multi-disciplinary. To facilitate this research, core facilities bring the latest imaging and scanning technologies to the research community and support many projects simultaneously. However, they often do so in the midst of significant information management challenges unforeseen at their inception, such as: (a) effective and efficient distribution of acquired scientific data from a core facility to its investigators; (b) timely sharing of raw, primary, and curated data for collaborative activities; (c) optimized scheduling and resource usage; (d) management of experimental workflow, e.g., multiple related steps in one-time or longitudinal studies; (e) management of administrative workflow, such as tracking of material cost, staff times spent on sample preparation and data acquisition, and billing and accounting; (f) monitoring of the overall resource usage of a core facility, by compiling, e.g., a profile of usage statistics of equipment and types of involved projects; and (g) coherent and common access point for data analysis workflow, linking raw data and/or primary data with results from analyses, reports, images, and references, and comparing with related results from existing databases and literature.

There are currently no comprehensive software systems addressing these challenges as a whole (Siemens' MIPortal focuses on improving the management of experimental workflow for proteomics research and does not address administrative issues). Deficiencies with the existing infrastructure are often manifested in: (i) substantial administrative and personnel overhead. This exists in pen-and-paper-based record keeping aided by disconnected spreadsheet programs, manual management of scheduling on a common off-the-shelf calendar system that operates in isolation, using portable media for data transport, and relying on e-mail communication to gather a variety of project related information. Some centers operate under an information technology (IT) infrastructure resulting from adopting/adapting existing open-source/in house/commercial software for managing a variety of data, although this only reduces the problem to the equally, if not more, challenging issues of information integration, interoperability, and resource for IT personnel support; (ii) lack of support for collaboration among researchers. The disintegration of administrative and scientific data makes it difficult to access data and find information about related prior studies. Collaborating researchers must then rely on ad hoc mechanisms such as email communication to share data and results. This not only makes the bookkeeping of data a chore, but it also lacks a uniformly enforceable standard for the safety of valuable data and results from analyses; (iii) significant amount of redundant, disintegrated, and inconsistent data. When data are kept in disconnected systems, information such as a principal investigator's profile and projects may have to be reentered multiple times to multiple systems, making it difficult to maintain and update. Repetition in data entry not only requires additional effort, but it also opens more room for errors and inconsistencies: the same entities may have been entered using different names in different systems, and changes made in one system may not automatically propagate to other systems; and (iv) lack of support for the integration of information from disparate resources. Access to data and knowledge is often labor-intensive, repetitive, disorganized, and burdensome; project management and data analyses are tasks relegated to individual investigators without a common framework or standard for record keeping or for sharing and collaboration using intermediate results.

The root cause for these deficiencies can be summarized as a lack of a holistic approach to infrastructure support. Given the challenges encountered by imaging and other kinds of core facilities, an approach that captures a vision for a long-term solution and addresses some of the immediate needs is desirable. The present multi-modality multi-resource information integration environment ("MIMI") not only addresses some of the needs and provides a flexible and expandable solution to the challenges mentioned above, but also provides a foundation for a more advanced system that substantially integrates existing knowledge with analyses and curation of experimental data.

The query interface is increasingly recognized as a bottleneck for the rate of return for investments and innovations in clinical research. Improving query interfaces to clinical databases can only result from an approach that centers around the work requirements and cognitive characteristics of the end-user, not the structure of the data. To date, few interfaces are usable directly by clinical investigators, with the i2b2 web client a possible exception. Aspects of query interface design that facilitate its use by investigators include query-by-example, tree-based construction, being database structure agnostic, obtaining counts in real time before the query is finished and executed, and saving queries for reuse.

Unlike previous art Phyiso-MIMI develops informatics tools to be used directly by researchers to facilitate data access in a federated model for the purposes of hypothesis testing, cohort identification, data mining, and clinical research training. In order to accomplish this goal a new approach to the query interface was necessary.

BRIEF DESCRIPTION OF THE DRAWINGS

Embodiments of the present disclosure are described herein with reference to the drawings wherein:

FIG. 9 illustrates a table detailing a preliminary evaluation performed on the efficiency of VISAGE for query construction;
FIG. 12 illustrates an example of how the use of Unobtrusive JavaScript creates cleaner HTML documents.

DETAILED DESCRIPTION OF THE PREFERRED EMBODIMENTS

Figure 1:
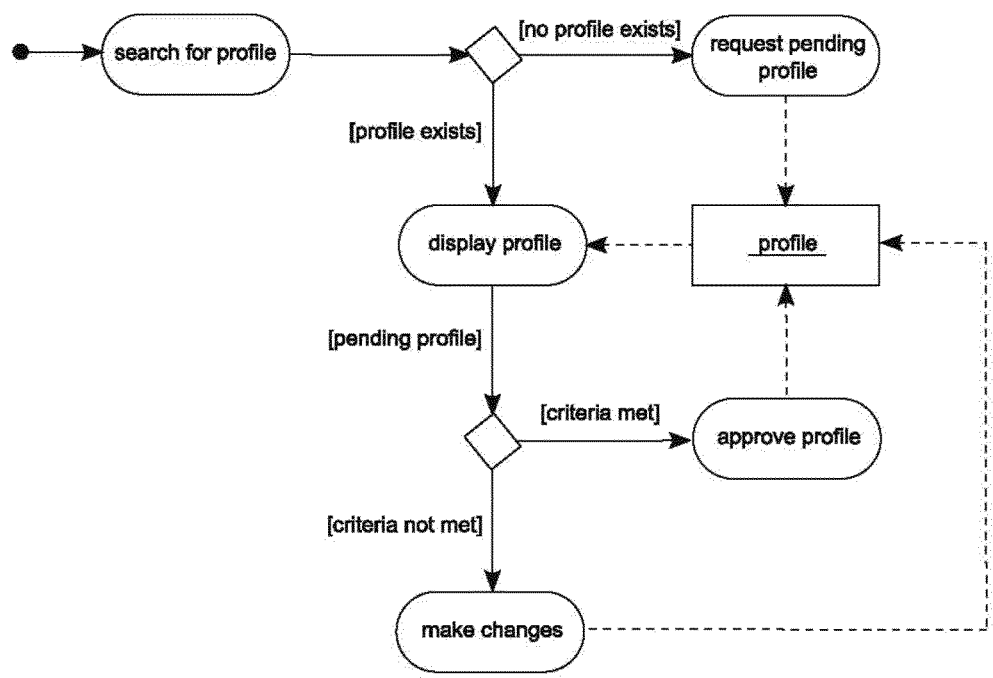
FIG. 1 illustrates a user profile model.

Reference will now be made in detail to embodiments of the invention, examples of which are illustrated in the accompanying drawings. It is to be understood that other embodiments may be utilized and structural and functional changes may be made without departing from the respective scope of the invention.

The rapid expansion of biomedical research has brought substantial scientific and administrative data management challenges to modern core facilities. Scientifically, a core facility must be able to manage experimental workflow and the corresponding set of large and complex scientific data. It must also disseminate experimental data to relevant researchers in a secure and expedient manner that facilitates collaboration and provides support for data interpretation and analysis. Administratively, a core facility must be able to manage the scheduling of its equipment and to maintain a flexible and effective billing system to track material, resource, and personnel costs and charge for services to sustain its operation. It must also have the ability to regularly monitor the usage and performance of its equipment and to provide summary statistics on resources spent on different categories of research. To address these informatics challenges, we introduce a comprehensive system called MIMI (multi-modality, multi-resource, information integration environment) that integrates the administrative and scientific support of a core facility into a single web-based environment. In one embodiment the design, development, and deployment of a baseline MIMI system may be used at an imaging core facility. In addition, the general applicability of the system may be used in variety of other types of core facilities. MIMI is a unique, cost-effective approach to addressing the informatics infrastructure needs of core facilities and similar research laboratories.

The present multi-modality multi-resource information integration environment ("MIMI") not only addresses some of the needs and provides a flexible and expandable solution to the challenges mentioned above, but also provides a foundation for a more advanced system that substantially integrates existing knowledge with analyses and curation of experimental data. The MIMI system comprises: (a) effective, efficient and secure data storage and archiving of a variety of imaging data (e.g., digital imaging and communication in medicine); (b) web-based access of acquired imaging data by researchers unconstrained by time and location; (c) sharing of raw and primary imaging data among collaborators; (d) resource scheduling and management; (e) monitoring of the overall resource usage of a core facility, by compiling, e.g., a profile of usage statistics of equipment and types of supported projects; and (f) built-in mechanism for tracking regulatory and operational qualifications [e.g., Institutional Animal Care and Use Committee (IACUC)].

In one embodiment, the MIMI system comes with a web-based interface to support core membership and project information management. It features an expandable and modifiable framework that can adapt to the needs of imaging and other kinds of core facilities.

In one embodiment MIMI adheres to the following set of guiding principles: it uses an open-source environment for development, it fully integrates the end-user into the developmental team, it maintains uniformly web-based, menu-driven, friendly user interface, it decentralizes data and information management tasks with role-based access control, semiautomated data flow, and resource scheduling to minimize overhead after deployment, it employs the latest methodologies and tools in IT and software engineering in software development.

The choice of an appropriate open-source developmental environment not only saves developmental cost, but also ensures that the system is modifiable and expandable without proprietary restrictions. The potential downside of a steeper learning curve and the stability of the supporting community may be overcome by a careful scrutiny of the available open-source packages and suitable training of the programmers. In one embodiment, MIMI uses Plone, which is an open-source content management system, as its main developmental environment, but other similar open-source content management systems that meet the desired requirements may be used such as, but not limited to, Ruby on Rails.

In one embodiment, Plone is chosen for its web-based interface for development and its built-in web-server incorporating the latest techniques for content-management, such as version control and cascading style sheets (CSS). Plone's object-oriented framework allows rapid development through code reuse and extension of proven functional modules. The object oriented paradigm allows objects placed insider other objects (such as folders) to inherit and reuse their parents' attributes, contents, and functions. Plone's object-oriented framework extends to the storage level, allowing developers to conceptually organize information in a logical manner that in turn speeds-up development. The Plone distribution is available for major operating systems such as Mac OS, Windows, and Linux, so a developer can select a preferred environment for development. In another embodiment, Ruby on Rails in place of Plone.

Fully integrating the end-user into the developmental team ensures usability, relevance, and impact to the targeted application domain. Although neither consciously nor strictly following the extreme programming practice, we find it extremely important to engage the end-user into all steps in the software development process. The engagement of the end-user helps realize two of the core values of extreme programming immediately: communication and feedback. Through regular meetings, ongoing changes to loosely specified requirements occur as a natural process. The adaptability to changing requirements is a more realistic and better approach than attempting to define all requirements at the beginning of a project, because the developer and the end-user rarely have complete foresight of the desired end product at its inception. Rather, the ongoing discussions become a cooperative activity that helps define, refine, and deepen the understanding of what is desired. However, discussions alone without a concrete system would not be effective.

This leads to the second aspect related to extreme programming: test-driven development. Although the goal of test-driven development is to make sure that current code meets requirements, we use these informal tests as a way to demonstrate the features and functionalities of the system to generate in-depth, timely, and specific feedback to the developer. Of course, any unusual behavior of the system will show as bugs or defects to be corrected for the next iteration of demonstration. Depending on the workload and available manpower, these live demos of partial working systems can happen on a weekly or monthly basis.

The remaining three principles of web-interface, decentralized content management, and employing the latest technology are: the web interface provides uniform and wide accessibility; menu-driven interaction provides more control over data input, output, and presentation; and decentralized content management reduces the overall management overhead after the system is deployed. However, achieving these requires a long-term vision and knowledge in several related fields.

In one embodiment the baseline MIMI comprises two main components: the Meta Server and the Data Server.

The Meta Server is the common front-end for MIMI's functionality. It is called "Meta Server" due to its role in managing all relevant alphanumeric data: user profiles, project information, scheduling information, data storage address information, access control, etc. It supports a web interface for data downloading after experimental data is acquired, using the client-server paradigm. Administrative functionalities are also supported by the Meta Server, such as validating user-supported information, assigning access privileges, and confirming requested scanning sessions.

In one embodiment, in a manager's role, a user can launch the usage-statistics program to monitor resource usage and generate statements for fees for the core. The Meta Server is also involved in the final step of data flow: after imaging data are acquired, a Java program, or any other similar program, can be launched from the scanner work station (usually a PC), which receives input about the address of a local folder containing the acquired data and a redundant array of independent disks (RAID) directory path on the Data Server representing the location where the data will be stored. The RAID path consists of metadata automatically generated by the Meta Server to represent the unique, readable, and in one embodiment humanly readable, directory path on the Data Server.

The Data Server is the backend for storage management of acquired data such as, but not limited to, image data and other experimental data. It uses a standard folder hierarchy for storage. To safeguard data from network viruses and prevent unauthorized access, the Data Server operates behind a hardware firewall with communication permitted only with the Meta Server and with the local area network (LAN) PCs attached to scanners. The Meta Server and the Data Server together achieve common functionalities of a data warehouse.

Design and Implementation

MIMI is designed to support a core facility's administrative and scientific workflows in a single system. In one embodiment, the administrative workflow comprises managing profile data on users and research projects, scheduling scanning sessions, billing services, and compiling performance statistics to monitor resource usage. The scientific workflow comprises managing scientific data and disseminating them to the relevant researchers through a common web-interface.

Figure 3:
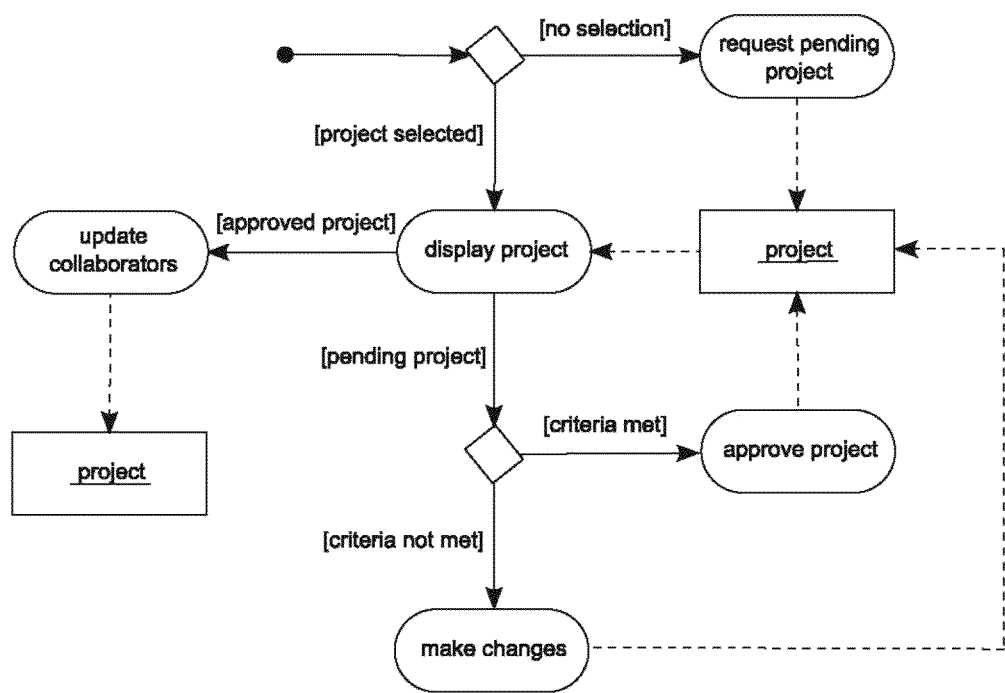
FIG. 3 illustrates a project model.
Figure 4:
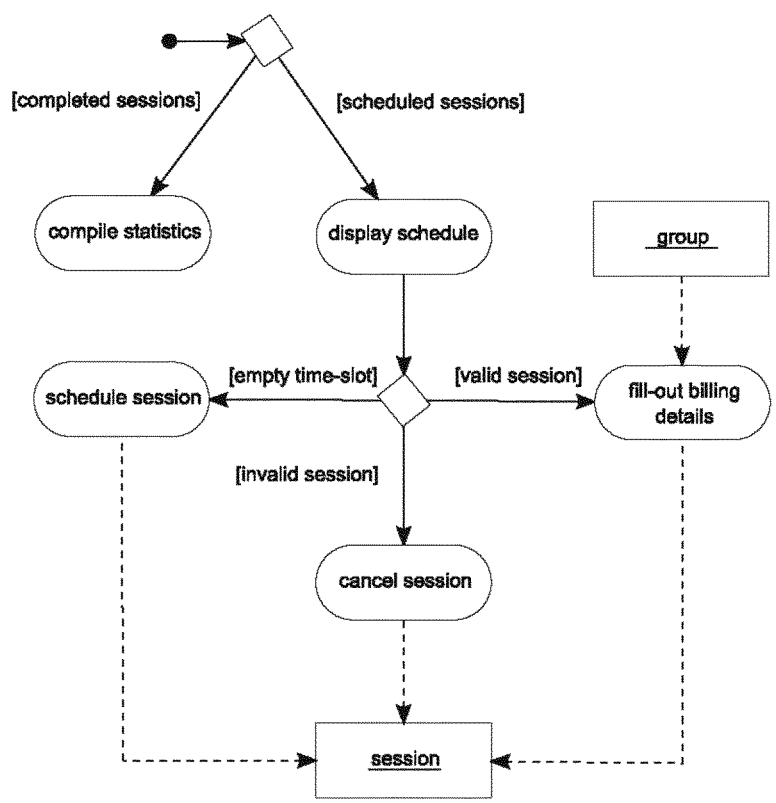
FIG. 4 illustrates a session model.

Three data models may be used for the administrative workflow (FIGS. 1, 3, and 4). The description of these data models follows the activity diagram specification of the Unified Modeling Language (UML). A solid dot represents the initial state. Rectangular boxes and round-corner boxes denote activities and objects, respectively. Solid arrows specify transitions between activities. Dashed arrows represent interactions with objects, i.e., dashed arrows entering or leaving an object represent modification/creation or retrieval, respectively.

Figure 5:
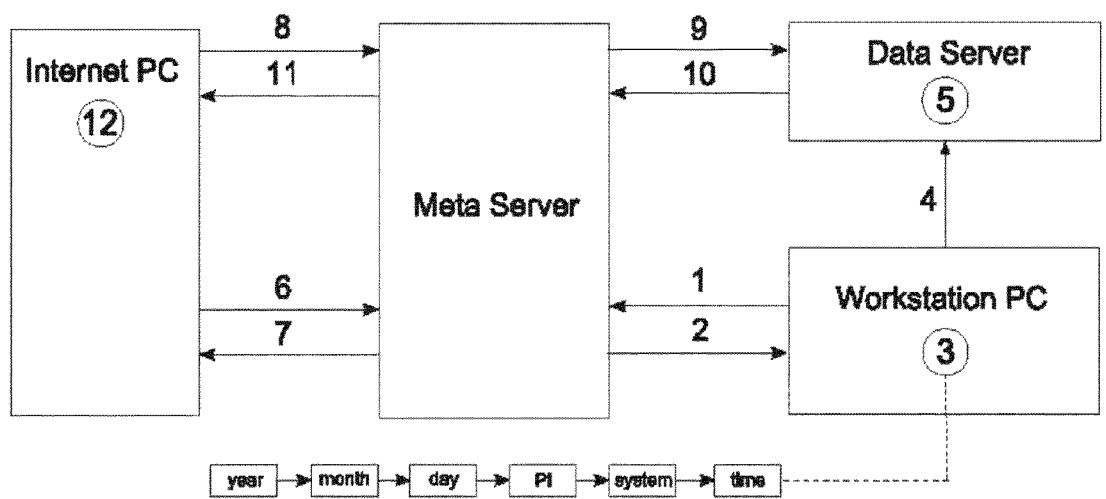
FIG. 5 illustrates a summary of the data flow process.

In one embodiment each data model supports the administrative workflow, each data model is implemented using Plone, and the scientific workflow is addressed through the data-flow model (FIG. 5).

User Profile Model

The user profile model in FIG. 1 specifies the behavior of the user management segment of the administrative workflow. The model is aimed to ease the data entry burden of a core facility by allowing the user to enter data, which will be validated by a manager in a core facility for it to become effective. The first action indicated by the model is searching for an existing user profile for a specific user. If the user profile does not exist, then it must be requested by the user as a pending user profile. Otherwise, if the user profile exists, then it will be displayed. The user profile model then proceeds to define actions for a pending user profile. A pending user profile that does not meet the criteria for approval needs to be modified by the user or a core facility manager. A pending user profile that meets the criteria for approval can be approved by a core facility manager.

Figure 2:
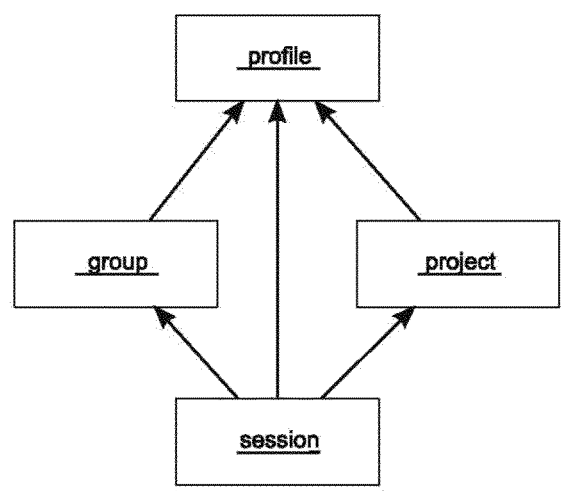
FIG. 2 illustrates a UML object diagram of Plone's objects and their inheritance relationships.

The Plone implementation of the profile model uses the profile object, which stores details about core facility users. The profile object resides at the top level of the Plone object hierarchy as shown in FIG. 2. It may capture information using, but not limited to, any of the following string attributes: first name, last name, e-mail address, institution, department, phone, fax, address, city, state, zip code, country, login ID, and status. In one embodiment, the last two attributes store a user's ID for logging into Plone and a value for pending (P) or approved (A) status, respectively. The profile object may also comprise a roles attribute that stores a list of user roles. Plone may access the value of the roles attribute to determine a user's access privileges.

In one embodiment, the four possible user roles may be Principal Investigator (PI), Coinvestigator (CI), Operator, and Manager (a user can assume multiple roles). Users with the PI role are researchers who have active research projects. Users with the CI role are collaborators who work with other researchers. Operators represent users who are qualified to operate equipment. Managers are core facility staff members with "superuser" privileges, i.e., they have access to all of MIMI's functionalities.

In one embodiment, when a user is granted the privilege to create a profile object, a profile request form is presented with input fields to capture information such as, but not limited to, a user's e-mail address and phone number. Once a user submits the profile request form, Plone creates a pending profile object with its status attribute that, in one example, may be set to "P." Core facility staff members with profile objects that contain "manager" as a value for the roles attribute are ultimately responsible for approving all pending profile objects. The main criterion for approval is verifying that a profile object's login ID is associated with the right contact information such as a user's e-mail address and phone number. Approving profile objects through Plone guards against malicious users who attempt to pose as others to gain access to private information.

Project Model

The project model in FIG. 3 specifies the behavior of the project information management segment of the administrative workflow. In one embodiment, the initial state of the model consists of a decision node that returns "Yes" or "No" depending on whether an existing project is selected. If "Yes", then the information about the selected project is displayed. If "No", then a user can request a new project or a pending new project. The project model then specifies actions for both pending and approved projects. A pending project that does not meet the criteria for approval must be modified by the user or a manager, whereas a pending project that meets the criteria for approval can be approved by a manager. In one embodiment, an approved project may be modified by its owner to grant privileges for specified collaborators, among the existing users, to access the associated experimental data.

The project model is implemented in Plone using a project object that captures information about a specific research project. The project object may use, but is not limited to, any of the following attributes to capture the associated information: name, PI, CIs, IACUC number, grant number, account number, and description. In one embodiment, the name attribute stores the title of an active grant or a pilot study. The PI attribute, which may store the ID of a profile object that contains "PI" as a value for its roles attribute, links a project object with a principal investigator. The CIs attribute specifies a project's collaborating users by storing the IDs of existing profile objects that contain "CI" as a value for their roles attribute.

In one embodiment, a project request form is implemented in Plone to allow a user to request a project object which, if approved, will have the user as its owner. This form contains input fields to capture project details as mentioned in the previous paragraph. It also presents a checkbox interface to allow a user to select user profile objects for inclusion as values for CIs. Once a user submits a project request form, Plone creates a pending project object with its status attribute set, but not limited, to "P."

In one embodiment, core facility staff members with profile objects that contain "manager" as a value for the roles attribute are ultimately responsible for approving all pending project objects. The criteria for approval includes, but is not limited to, checking that a project object's grant number and account number are valid.

In one embodiment, a user can also use Plone to view approved project objects that the user is associated with, i.e., the user is the project PI or a collaborator. In the case that new collaborators arrive, or old ones depart, a user may modify the list of collaborating users for these approved project objects through a web-based checkbox interface. In one embodiment, for security purposes, a user cannot create new users (i.e., profile objects) and may only select collaborators for a project from existing profile objects. Relegating the management of project collaborators to project owners (i.e., PIs) is an example of decentralized content management, which alleviates the data management burden of a core facility. A collaborator of a project is typically granted the privilege to access experimental data resulting from the project.

Session Model

In one embodiment, the session model, as shown in FIG. 4, specifies the behavior of the scheduling, billing, and usage-statistics compilation segments of the administrative workflow. The initial state of the model is a decision node to determine which actions to perform depending on whether completed or scheduled sessions are selected. In one embodiment, if completed sessions are selected, usage-statistics compilation may be performed. If scheduled sessions are selected, a calendar with the scheduling information will be displayed. The session model specifies further actions for scheduled sessions and empty time slots on the schedule. A scheduled session that is invalid (incorrectly scheduled) will be canceled, whereas a scheduled session that is valid (correctly scheduled) will be followed by input for billing details. An empty time-slot on the schedule permits the scheduling of a new session within the selected time interval. In one embodiment, the Plone implementation of the session model uses the session object, which represents a scheduled or completed session for an imaging system. The session object resides at the lowest level of the Plone-object hierarchy. It stores information using, but not limited to, the following attributes: imaging system name, date, time-slot, project, operator, scanned items, time duration, total cost, status, and Data Server Path, which may also be know as the RAID path. The project attribute stores the ID of a project object related to the session object. From the project object, relevant project information such as a PI's name will be automatically retrieved and displayed on the session schedule. The operator attribute stores the ID of a profile object that has "operator" as a value for its roles attribute. The operator attribute may also track the user who operates an imaging system during a session. The scanned items attribute stores the IDs of entities such as, but not limited to, small animals, large animals, cell plates, cells, other cellular material or any other entities that are used during a session and the status attribute stores a value of scheduled (S) or completed (C).

In one embodiment, MIMI features a web-based scheduling interface for imaging systems. The scheduling interface uses a combination of DHTML and AJAX to approximate the response speed and the look and feel of a desktop application. Users can create a new session object by dragging the mouse cursor over an open time-slot that spans at least one 30-minute interval and then selecting a research project object. The interval size may also be 15-minutes, 1-hour or any other multiple of 15-minutes. A new session contains values for, but not limited to, the following attributes: imaging system name, date, time-slot, project, and status (S). A user can then use MIMI's scheduling interface to perform cancellations or to access the supplemental billing form to choose values for the remaining attributes.

In one embodiment, MIMI's supplemental billing form contains fields that capture billing details such as time duration and cost information. It also allows a user to select the profile object for inclusion into the operator attribute. A user may also use the supplemental billing form to select scanned items by choosing group objects. A group object represents a collection of entities that have similar characteristics. In one example, female mice with the same vendor and strain may translate into a single group object. A group object uses the following key attributes to store information such as but not limited to: name, species, strain, vendor, and item IDs. In one embodiment, the item IDs attribute stores a list of unique IDs for each item of a group object. A user who submits the supplemental billing form initiates the process of automatic cost computation. MIMI then sets a session object's status attribute to completed (C) and updates the values of the remaining attributes.

In one embodiment, the resource usage compilation capability may allow a core facility to regularly track the usage of its equipment and provide important and useful summary statistics on different aspects of the daily operations of a core. MIMI can generate performance assessments of imaging systems with different time intervals. When compiling a performance assessment, Plone locates the relevant completed session objects and sums the values of their time duration attributes. Plone's built-in search interface may be modified to filter completed session objects using criteria such as, but not limited to, principal investigator, project, and date range through text-fields and dropdown lists.

Data-Flow

MIMI addresses a core facility's scientific workflow with the data-flow process. FIG. 5 is a summary of the data-flow process. MIMI implements a data-flow process that seamlessly links data with the associated session metadata.

FIG. 5 is a summary of the data-flow process that shows: 1) User requests to view scheduled session; 2) Meta Server replies with session object; 3) User copies Data Server Path string into Uploader application; 4) Uploader application sends scientific data to Data Server; 5) Data Server stores scientific data; 6) Person requests to view downloading interface; 7) Meta Server replies with downloading interface; 8) User issues download request; 9) Meta Server forwards download request to Data Server; 10) Data Server sends scientific data to Meta Server; 11) Meta Server forwards scientific data to Internet PC; and 12) User stores scientific data on Internet PC.

In one embodiment where the seamlessly linked data is imaging data, when MIMI implements a data-flow process that seamlessly links imaging data with the associated session metadata, with the completion of an imaging session, imaging data is stored in a standard folder hierarchy on the attached local work station PC. The operator then selects a jar file on the work station PC. The jar file is a Java executable program for the Uploader application, which is responsible for transferring the scanned imaging data to appropriate folders on the Data Server. After launching the program, the user looks up the correct session object from the Meta Server and retrieves the value of its Data Server Path Attribute—a value automatically generated when a session object is created from the scheduling interface. In one embodiment, the Data Server Path value is a string with six main parts, year, month, day, PI name, imaging system name, and time-slot, that uses the backslash as a delimiter. Because MIMI automatically accounts for scheduling conflicts, the Data Server Path value represents a unique storage location on the Data Server. The operator copies the Data Server Path value, pastes it into a textbox of the Uploader application, and selects the local directory path for the folder containing the imaging data. Once the origin and destination for the imaging data are given, the Uploader application initiates a data transfer session with a single mouse-click.

At the receiving end of the data transfer process, the Data Server runs a Receiver Script that listens continuously for requests from active Uploader applications. For all incoming requests, the Receiver Script first obtains the Data Server Path string. The script then fetches an incoming file's path and its name and concatenates them to the Data Server Path string to form an absolute storage path. The Receiver Script parses the absolute storage path into a valid folder hierarchy and creates any missing folders to form a unique storage location. The script then creates an empty file object and retrieves its contents by streaming binary data in 65,535-byte increments. The entire cycle repeats until all files transfer successfully to the Data Server.

Once data such as, but not limited to, imaging data is moved to the Data Server, it can be immediately downloaded by their owners and collaborators through the Meta Server. MIMI supports this step with a Retrieval Script that runs on the Data Server and listens continuously for requests by the Data Request Script that runs on the Meta Server. The communication process begins when the Data Request Script accesses a session object, obtains its value of the Data Server Path Attribute, and sends this value along with a relative folder path to the Retrieval Script. The Retrieval Script joins the Data Server Path value and the relative folder path to form a query path. The Retrieval Script then opens the query path on the Data Server and obtains a list of its files and folders, if there are any. The script then iterates through the list, computes file and folder sizes, and forwards these details to the Meta Server. The Meta Server dynamically constructs the visual downloading interface and sends it to the user. After the user selects files or folders to download, the Data Request Script builds a list that holds their path strings and sends it to the Retrieval Script. The Retrieval Script creates a temporary zip file and populates it by iterating through folder paths in the list and fetching any files. In the end, the Retrieval Script sends the zip file to the Data Request Script, and the Data Request Script forwards it to user's local desktop. In one embodiment, when a file is larger than 1 GB, the Retrieval Script virtually partitions the file and allows the user to download individual pieces. When a user encounters a folder larger than 1 GB, it is also possible to download only a subset of its contents at one time.

An innovative feature of MIMI's implementation of the data-flow process is the Data Server Path Attribute, which enables the treatment of imaging data as binary files. This unleashes MIMI from the complexity and variety of image file formats, such as dcm, nifti, analyze, and other known image file formats, and avoids conversion to any standard data formats. The necessary metadata, usually stored as header information, resides in the portable path names for the folder hierarchy. It also serves as imaging data's unique IDs.

In one embodiment, the Meta Server and the Data Server are deployed with a carefully chosen set of hardware and software components. The Meta Server runs on a Dell PowerEdge with dual 3-GHz Intel Xeon processors, 4 GB of DDR2 RAM, and two 300-GB 10-K RPM Ultra-SCSI hard drives. It operates using Redhat Linux and runs an Apache front-end for secure sockets layer (SSL) transmission.

In one embodiment, the Data Server may operate under a variety of operating systems such the Windows 2003 operating system and provides a RAID with eight 300-GB hard drives connected with Dynamic Network Factory's 8-channel controller handling the RAID-5 functionality.

In one embodiment, VISAGE (VISual AGgregator and Explorer) is developed as a query interface for clinical research. A user-centered development approach is followed and incorporates visual, ontological, searchable and explorative features in three interrelated components: Query Builder, Query Manager and Query Explorer. The Query Explorer provides novel on-line data mining capabilities for purposes such as hypothesis generation or cohort identification. In one embodiment, the VISAGE query interface has been implemented as a significant component of Physio-MIMI. Preliminary evaluation results show that VISAGE is more efficient for query construction than the i2b2 web-client.

In one embodiment, VISAGE is a query interface that may be used in Physio-MIMI, a device that may be used to, but is not limited to, improve informatics support for researchers conducting clinical studies. In one embodiment, the Physio-MIMI data integration environment has two salient features. First, it is a federated system linking data across institutions without requiring a common data model or uniform data source systems. This would greatly reduce data warehousing activities such ETL, often a significant overhead for data integration. Second, Physio-MIMI is tightly focused on serving the needs of clinical research investigators. VISAGE must therefore provide robust data mining capabilities and must support federated queries, while still being user-friendly. In one embodiment, VISAGE may be directly used by clinical researchers, for activities such as data exploration seeking to formulate, clarify, and determine the availability of support for potential hypotheses as well as for cohort identification for clinical trials.

Such an interface would enable an evolution of the data access paradigm: the current paradigm (left of FIG. 6) is one in which clinical investigators communicate a data request to an Analyst or Database Manager (1) who in turn translates the request into a database query and interrogates the database (2) to obtain requested data, finally returning results (3). The time span between 1 and 3 in the left of FIG. 6 may be weeks if not months, and steps 1-3 often need to be repeated as the query criteria are refined.

Figure 6:
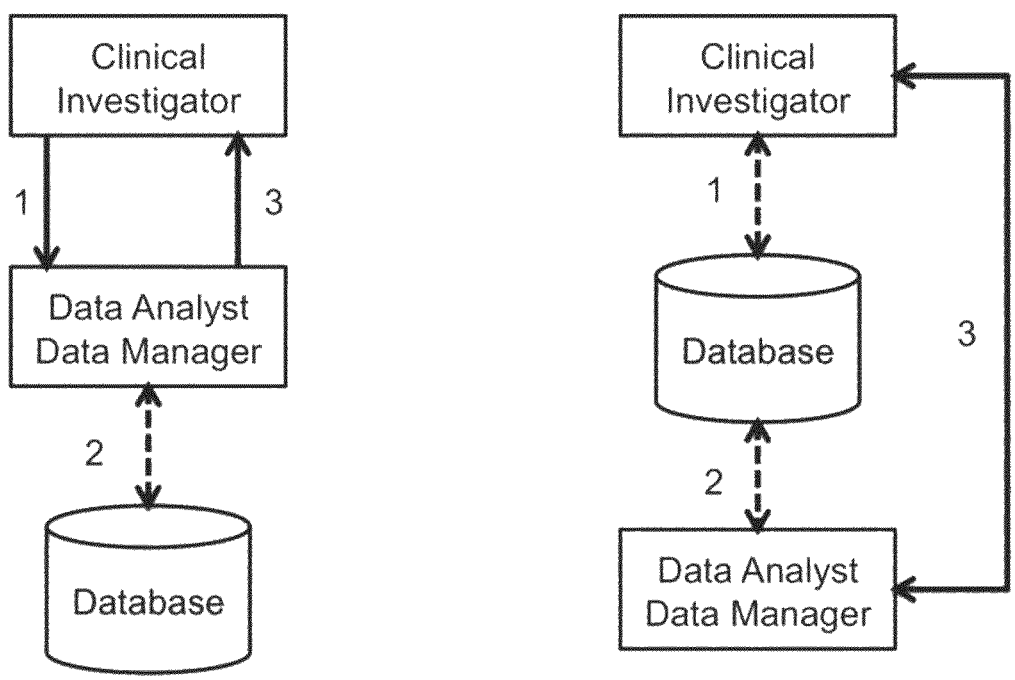
FIG. 6 illustrates the evolution of the data access paradigm.

VISAGE seeks to change this to a paradigm which empowers clinical investigators with data access and exploration tools directly (right of FIG. 6). In this case clinical investigators (1) and data analysts (2) access data directly, and then perform collaborative data exploration (3) as shown on the right side of FIG. 6.

A user-centered approach, proven essential for successful user interface development for websites was used for the design, implementation and preliminary evaluation results of VISAGE. This approach requires the engagement of the end-user in all steps of the developmental process, such as needs analysis, user and task analysis, functional analysis and requirement analysis. To improve usability, VISAGE incorporates visual, ontological, searchable and explorative features in three main components: (1) Query Builder, with ontology-driven terminology support and visual controls such as slider bar and radio button; (2) Query Manager, which stores and labels queries for reuse and sharing; and (3) Query Explorer, for comparative analysis of one or multiple sets of query results for purposes such as screening, case-control comparison and longitudinal studies. Together, these components help efficient query construction, query sharing and reuse, and data exploration, which are important objectives of the Physio-MIMI project.

In one embodiment, the agile development methodology was adopted to make VISAGE usable directly by clinical researchers. A key requirement of this methodology is the close interaction between the developers and the users. In designing VISAGE, user-centered design principles were followed, which involve use cases, user and task analysis and functional analysis, described in the rest of this section.

In one embodiment, the overarching use case for VISAGE, of which there are several more specific thematic variations, is a clinical researcher exploring available data with the intent of discovering the nature, scope, and provenance of the data as it may apply to the researcher's interests and intended uses. Among the variations are, but not limited to, the following: (1) searching for hitherto unnoticed patterns of association and correlation among the available data that suggest or reinforce nascent research hypotheses; (2) deriving and assembling clinical, demographic, behavioral, and assay data sets for use in statistical analyses that can be used in the justification of funding proposals for research studies; and (3) profiling patient populations to determine the availability of cohorts who could be recruited as subjects in proposed research studies.

Such tasks are commonly referred to as data mining, typical down-stream steps that require in-depth analysis, by statisticians or computer scientists, of queried data sets for the discovery of patterns and associations. In one embodiment, VISAGE's Query Explorer interface serves to incorporate those activities that are typically carried out in such downstream data mining analysis, in order to support discovery-driven query exploration by clinical investigators directly. VISAGE is not designed to replace the role of data mining; rather, it complements data mining by incorporating steps that may be routinely performed before a more in-depth, off-line analysis.

In order to support hypothesis generation and testing and cohort identification, an interface that greatly accelerates access to relevant data sets: past queries should be quickly recallable; new queries should be easily constructible; existing queries should be readily modifiable is needed.

The sense of exploration would quickly diminish if it takes too much effort or too much time for a set of queries to return meaningful results. To help achieve a speedy response of the system during the highly explorative phase of the user, VISAGE provides the user a choice of three tiered query results: counts only; counts with attribute vectors; attribute vectors with associated files (physiological signal data, genetic data, or other large binary files such as images). Typically, results are limited to counts and aggregate statistics until the user achieved a sense of which direction to pursue further.

In one embodiment, the Query Explorer and some of the design features are aimed at reducing the user's effort in formulating new queries and revising existing ones. The visual slider bars have the added advantage of error reduction for constraint specification.

A federated model was used due to the complexity of the clinical and physiological data to be available through Physio-MIMI. Rather than forcing each data source to conform to a standard database schema, Physio-MIMI is based on the mapping of individual databases to a common Domain Ontology (DO). The DO consists of a set of concepts (terms) in a selected domain and the relationships between the concepts. The concepts are organized in hierarchical (SubClass, IS-A) relationships, as well as others such as, but not limited to, "part Of", "findingSite", "associated-Morphology", etc. The Query Builder, backed by the domain ontology, provides a searchable list of terms as the starting point. And for each term, it provides the user with context-specific navigation to explore its relationships—allowing the user to traverse up or down the parent-child hierarchical relationships as well as along the other axis relevant to the term in order to further refine the query. By employing the DO, a standard set of terminology can be employed while allowing individual data contributors to maintain data according to their desired schema. The ability of VISAGE to query across disparate databases across institutions is therefore dependent on this ontological mapping. The Query Builder provides the user interface to formulate the necessary patterns—allowing the construction of a logical query. The logical query is translated into a local database query based on the mapping between the ontology model and the database specific data model.

Figure 7:
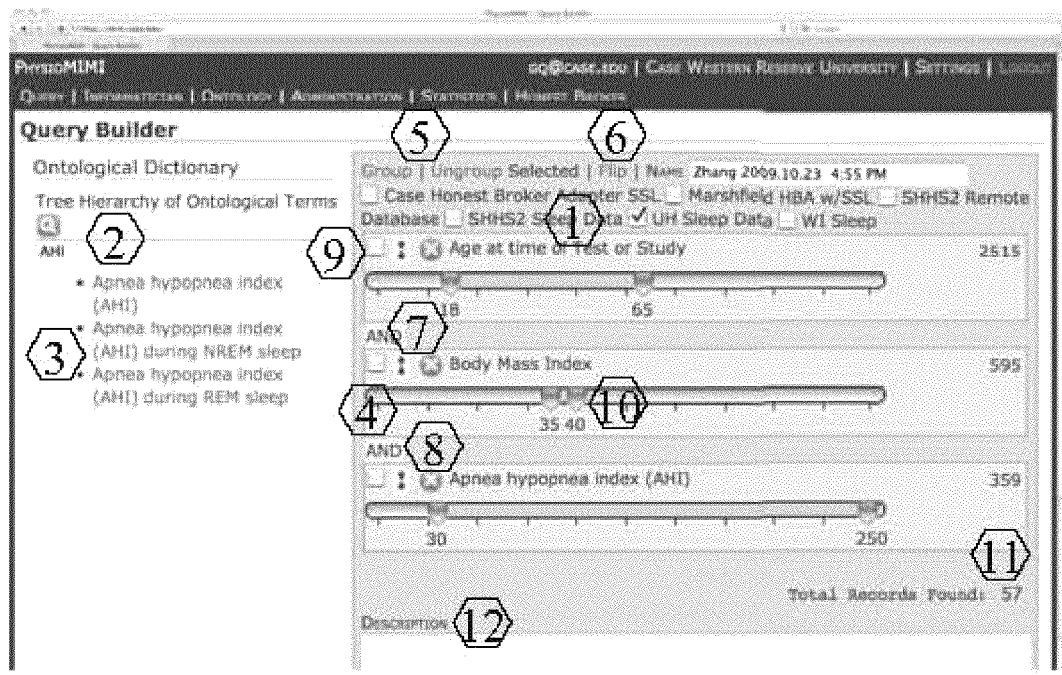
FIG. 7 illustrates an example of a Query Builder interface.
Figure 8:
FIG. 8 illustrates an example of a Query Explorer interface.
Figure 10:
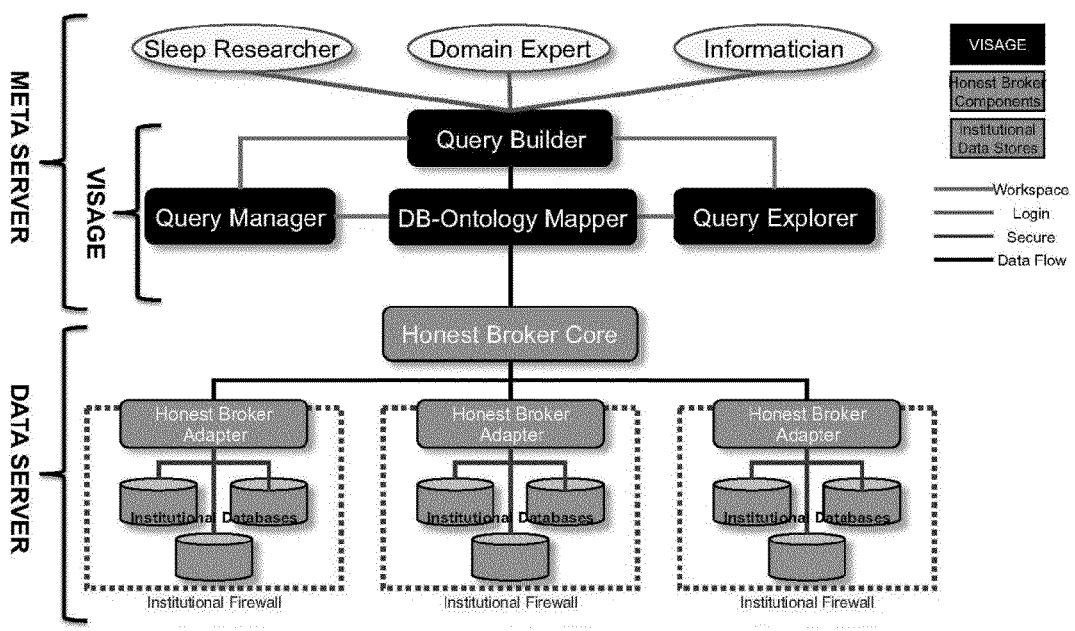
FIG. 10 illustrates one embodiment of the conceptual architecture of Physio-MIMI.

The resulting design and implementation of Query Builder (FIG. 7) and Query Explorer (FIG. 8) is shown in FIGS. 7 and 8. The Query Manager saves queries (optionally their results) for reuse, which may be searched by keywords in title, description, or the query itself (e.g., for finding queries about a specific symptom or disorder). The functionalities of Query Manager are similar to that of an email management application.

Query Builder

The query builder interface includes functional areas 1-12 shown in FIG. 7. As shown in FIG. 7, the Database Selector 1 allows a user to select which database(s) in the system against which to run the query. VISAGE allows informaticians to quickly make data sources available for querying by supplying tools for secure database connectivity and online tools for mapping database elements to DO concepts. Once mapped, the database can be available to query and will appear to the user in the Database Selector. Using the Query Builder researchers can quickly generate a query across multiple databases or compare results of the same criteria against different databases.

The Search Bar 2 allows the user to search the hierarchy of terms, displaying those that match in the Term Selection Area 3 below. When terms are clicked, they are added to the Term Display Area 4. As mentioned above, the user can search for any synonyms of concepts in the ontology and be presented with the appropriate ontological concept. The searchable list of terms is backed by the DO and provides the user the ability to navigate using ontological relations to further refine the query. To use the VISAGE interface, a clinical researcher needs only to understand the clinical model (domain ontology), and the Query Builder provides the interface for formulating the necessary patterns for the construction of a logical query. The logical query is then translated into a database-specific query based on the mapping between the ontology model and the database schema.

In one embodiment, the query's logic is in Conjunctive Normal Form, which means records need to only satisfy at least one condition in each group to be included in the query result set. To change to Disjunctive Normal Form, the Flip 6 action is made available. The grouping logic is denoted by the color of the box. In one embodiment, elements in a green box are logically connected by AND, while elements in a light blue box are joined by OR. However, the boxes may be of any desired color. Terms can be selected with the checkboxes and grouped together or separated by clicking Group or Ungroup 5, allowing for different parenthetical groupings of terms for the conjunctive or disjunctive relationships. Additional term manipulation functionality includes Rearrangement 7, which lets a user drag and drop the terms to arrange them how he wishes, and Deletion 8, which allows removal of terms that the user may have mistakenly added to the query. To specify inclusion conditions, each term added to a query comes with term-specific controls.

For categorical data, Checkboxes 9 may display the possible values for categorical variables. The values for categorical variables may also be derived from the DO, and map to specific values in the underlying database schema(s). A user needs to only know the conceptual categories not the underlying structure, and due to the VISAGE database mapping individual databases need not code categorical variables in the same manner. For continuous variables, Sliders 10 allow easy and expressive creation of intervals, with ranges of inclusion specified by light blue shading as well as numeric display. The Sliders have the additional advantage of allowing for the creation of multiple disjoint intervals, something that is often not possible in interfaces that provide manual specification of continuous ranges.

When the user is finished adding terms and modifying inclusion conditions, the number of records that satisfy the conditions is displayed in the Result Count Area 11. Finally, the user can Describe/Save/Update 12 the query to the Query Manager for future use in the Query Explorer or re-use in the Query Builder.

Query Explorer

The Query Explorer allows the records returned by one or more queries to be further investigated. Not only can the user view distributions of the terms that were used as criteria in the specification of a query, but any other available term may be selected for exploration within that result set. The Query Explorer provides numeric distributional information including frequency and percent for each level of categorical variables, and mean, standard deviation, and range for continuous variable. The Query Explorer also provides graphical displays of distributions including pie charts and histograms for categorical and continuous variables, respectively.

Discovery-driven query exploration may start with one, two or multiple queries in a query group, arranged in a specific order by the end-user, not unlike a workflow. The queries in a query group are "aligned" to allow the user to zero in on selected attributes to gain a sense of value distribution of the selected attribute among the patients represented in the query results.

By exploring the value distribution of a certain variable within a set of query results, a user may discover how some of the baseline query criteria influence the value distribution of specific attributes, as shown by example in, but not limited to, the pie-chart in FIG. 8, without issuing another query with an additional attribute specified.

The following is an example of a use of Query Explorer and Query Builder, but is not, in any way, a limitation. FIG. 8 illustrates an explorative step for the query used in FIG. 7, where no gender criteria is included. The Query Explorer interface allows one to search and select variables that may or may not be present in the original query. The pie-chart in FIG. 8 shows the gender distribution in the result for the selected query in FIG. 7. The histogram of age distribution is displayed on the right in FIG. 8. A user may select two or more queries so a user can explore a variety of patterns and studies such as, but not limited to, potential patterns for a case population and a control population (one query for each), or for Longitudinal Studies (same query with varying time points).

VISAGE is a powerful interface that is intuitive, usable and simple. Agile and user-centered methodologies are used for the query interface development. It entails that a clear separation between design and implementation is neither feasible, nor necessary. Design versions are usually at a conceptual or functional level, and the details are relegated to the prototyping phase, which drives the design revision. Rapid prototyping of VISAGE may be achieved through the use of various Open Source Web development tools and frameworks including Ruby on Rails, Prototype, and script.aculo.us JavaScript libraries. All of these are web-based (Web 2.0) and work across platforms.

Multi-Modality, Multi-Resource Environment for Physiological and Clinical Research (Physio-MIMI) is an innovative data federation platform. In one embodiment, Physio-MIMI sported an expandable Domain Ontology; fine-grained interface for role-based data-source level access control; plug-and-play adaptor to mediate data access services; and data schema to Domain Ontology (DO) mapper that transforms local databases into integrated resources accessible using the intuitive and powerful federated, query interface VISAGE. In another embodiment Physio-MIMI developed an ontology-driven, federated data sharing system to access multiple sources of data covering both clinical and physiological domains using, but not limited to, medicine as the primary exemplar; and developing a suite of tools for curation of physiologic recordings including EEG, ECG, EMG, from vendor specific polysomnography (PSG) data formats to data in (open-source) European Data Format (EDF), making study-level information and signal-level information sharable across laboratories.

Physio-MIMI has broader implications as a unique pilot model for: collaboration among multiple CTSA sites; collaboration among informaticians, domain experts, and project managers; agile development, management, and communication frameworks in an academic setting for producing easy-to-use, production-strength tools integrating end-user testing in each step of the delivery milestones.

Physio-MIMI has many complexities due to the breadth and depth of data sources used, multi-plicity of software environments and tools involved, the distribution and dynamics of personnel and multi-site collaboration, and the short delivery timeline. In one embodiment, expanding the application scope of Physio-MIMI's system architecture and accelerating the dissemination of the software to the larger CTSA community is used.

In one embodiment, organization and communication are an important aspect for the success of this project. The complexity of the system to be developed and the usability of the web-based interfaces by clinical investigators mandated an agile approach in which not all details of the design were fully specified before a limited-scope prototype could be tested and progressively extended. The desired integration of domain-experts, informaticians and project managers in the same team required effective communication not only across institutions, but also vertically within an institution. Specifically for institutions with main developmental responsibilities.

In one embodiment, one goal is for a required close interaction among diverse disciplines, a matrix organizational framework where members from participating institutions were assigned clear roles and responsibilities was developed to address this issue. Representative leads from each institution are highlighted in the table below.

In one embodiment, five committees/subcommittees were planned: the Executive Committee, Domain Experts Subcommittee, Informatics Subcommittee, Ontology Subcommittee and Steering Committee. The Executive Committee consisted of the PIs, the Project Manager and the software and tools developers. The Steering Committee consisted of the representatives responsible for major roles from each institution. The Domain Experts and Ontology Subcommittees were combined into a Domain Ontology Subcommittee early on due to their substantial overlapping objectives. This organizational framework allowed for the informaticians and domain experts to work independently within their own areas, and coordination through the Steering Committee.

At least two vehicles were used to facilitate communication: project wiki and Rally.

Project wiki: A dedicated private project wiki site was proposed and implemented. All team members had edit privilege to all content areas. Continuous documentation in such a wiki site was found to be valuable for sharing information, recording design specification, and providing a history for the "thought process" for major design decision and revision. Meeting schedules and minutes were also posted on the wiki.

Rally: A shared community version of Rally was used by project managers for agile project management. Milestones were broken into stories, stories were broken into tasks, which were assigned to developers of the team with clearly defined artifacts, estimated effort and timeline. This greatly facilitated planning and scheduling of releases. Bug-fixes identified in testing were also recorded in Rally as tasks. Finished tasks were checked by an independent observer. Rally also greatly facilitated preparation.

In one embodiment, agile software development methodology is suited for projects where high level goals can be quite clear, but the pathways achieving these can be murky at the beginning. System and functional requirements are often under-specified because of the high-risk and experimental nature of a project. Agile software development, although fitting in a multi-disciplinary environment, is not often fully practiced in an academic setting. The integration of the informaticians and domain experts in the same team and the scope and complexity of the project made the agile software development methodology a useful option for the Physio-MIMI.

Rapid incremental prototyping and iterative refinement are the hallmarks of agile development. In contrast, the traditional Waterfall approach requires a clear and complete separation of the design phase and the coding phase. For Physio-MIMI, because the tools were originally developed for use by clinical sleep researchers, it was not feasible for either the informaticians or the domain experts to develop a design document with a complete set of details for the envisioned system in advance. Instead, the full-specification embodied in the final release emerged as a result of a highly collaborative process involving frequent and close interactions between the informatics team and the sleep researcher team. This process consisted of iterative cycles of design, coding, testing, demoing, evaluation/feedback, with each iteration spiraling closer towards a fully-fledged system.

To inform the agile process, Physio-MIMI adopted four Use Cases of increasing complexity to guide the informatics development: (1) determine availability of potential subjects meeting inclusion-exclusion criteria for designated analyses; (2) identify members of a candidate cohort based on inclusion-exclusion criteria; (3) retrieve data for analysis (PSGs, annotation files, etc.) for specified members of the analytical data set; and (4) cross-link information in research databases with data obtained from PSGs via application of dedicated quantitative processing algorithms.

All Use Case development was led by the Domain Ontology Subcommittee with assistance from the Informatics Subcommittee. With higher-level system components of Query Builder, Query Manager and Query Explorer along with its Database-to-Ontology mapper, the Use Cases helped identify an increasingly rich set of variables to be captured in the SDO for the subsequent iteration. Each iteration typically took 2 to 3 weeks.

Agile development informed by UCs allowed us to produce incremental prototypes with gradually enhanced features for testing and demo. The testing and demo by the informaticians inspired feedback from the rest of the team for further development and refinement, but it also suggested architecture changes from time to time. One change involved the elimination of the Honest Broker Core from the system architecture. Another allowed for direct PSG file downloading.

In one embodiment, agile software development can greatly facilitate the implementation of a complex project. Use cases provide a valuable mechanism to facilitate agile development in defining project iterations and milestones. However, success of agile development is conditioned on a set of basic requirements, which makes it not universally applicable.

Despite the overall excellent level of communication, team members felt that greater involvement of the technical experts in the development of the UCs would have enhanced their understanding of the project and better guided initial software development. Thus, an important lesson is the importance of ongoing communications among the end-users and developers.

Agile development requires that the developer team members have compatible levels of expertise and are not afraid of coding without a completely specified design in writing. This is because not all team members have a predefined set of tasks, and software components to be developed are dynamically generated and assigned from iteration to iteration. The project's ability to continue without interruption may be attributed to the overlap in roles and shared responsibilities and paired-programming (each key software component was assigned to least two developers at all times). In one embodiment, future similar projects using the agile development paradigm would be to use research developers such as those with advanced degree with good coding experience, who can be at ease with self-teaching a new tool and are always in the outlook for new technology and best-practices.

Adoption of a Management Tool. Even though agile software development was selected as the developmental methodology, using a Community Edition of Rally proved beneficial as the benefits of Rally in supporting project management, communication and reporting became clear.

In one embodiment, because of the frequent updates of code base during each iteration in agile development, version control becomes an essential part of project management, especially to facilitate the collaborative development among team members. In one embodiment, Physio-MIMI used the Subversion Version Control System (svn) to maintain two code sets at all times: developing version and production version. The developing version represented a code set that was under active development, while the production version represented a code set that was stable enough for testing and evaluation, but did not have all the latest features. Near the end of the project, we switched to the Fast Version Control System Git to account for code branching, making it possible to develop systems that shared some basic features but had a disjoint set of more specialized features for different purposes. Git provided the desired flexibility for continued improvement of the shared basic features for different branches as well as the merging of specialized features at a future point.

In one embodiment, Physio-MIMI is designed to be focused on breaking new grounds in data integration and data access, rather than building on existing frameworks with incremental enhancements. This ambitious goal was embodied in the novel uses of ontology for directly driving the federated query interface VISAGE and for integrating autonomous data resources through the database to ontology mapper. These uses were beyond the traditional role of ontologies for terminology standardization and data exchange. To provide flexibility in reusing the same framework beyond sleep medicine with ontology as a plug-and-play component, additional aspects of the terms were captured. These include value type, min-max values, and units conversion. These additional aspects resulted in a Physio-MIMI-style domain ontology framework, for which the Sleep Domain Ontology developed specifically for this project served as the first and primary example.

In one example, in developing the Domain Ontology (DO), Use Cases were created for identifying an initial list of about 50 domain-related terms covering, but not limited to, laboratory findings, time intervals, disorders, procedures, medications and summary measures. A set of ontological modeling principles were followed in the development of DO: (1) reusing existing reference ontological terms when available, (2) conforming to standard frameworks, and (3) striving for generality and reusability. Following this set of principles, the standard ontological systems such as SNOMED-CT and FMA were systematically reviewed for possible reuse of existing terms. Although SNOMEDCT contained over 300,000 concepts, its coverage of the domain terms was poor. The two unique intended roles of ontology for Physio-MIMI entailed that a wholesale import of SNOMED-CT and FMA terms into Physio-MIMI would not likely be cost-effective. Additionally, the specific Physio-MIMI-style domain ontology framework needed for driving the VISAGE interface implied minimal value in such a direct import. Therefore, a segmentation algorithm was used to extract a set of limited terms from the two reference ontologies. To improve efficiency and interoperability, we used an open ontology framework for developing the DO, drawing upon concepts and structure within, but not limited to, Basic Formal Ontology (BFO), Ontology for General Medical Science (OGMS) and the Computerized Patient Record (CPR) ontology in addition to the integration of reference ontologies such as FMA. Term definitions were provided by domain experts, supplemented with information from reference handbooks and other web resources.

Physio-MIMI has been conceived as a distributed system with modular components providing different services using a Service-Oriented Architecture (SOA). The proposed high-level Physio-MIMI architecture consisted of the Meta Server, the Data Server and the Application Server. The Meta Server was instantiated and refined through the VISAGE interface. The Data Server referred to the collection of data sources, including EDF files, available for query access. The Application Server consisted of a suite of tools for the normalization of signal attributes and the translation of header information contained in vendor-specific PSG files: EDF Editor, EDF Translator and EDF Viewer. Communication between the Meta Server and the Data Server was facilitated through secure messaging using Honest Broker.

Guided by the proposed high-level system architecture early in the project, the development team adopted a set of components from the MIMI system such as user registration, access control, and auditing, and incrementally refined the initial design with the development of additional components outlined in VISAGE.

During development, execution of Use Cases and an analysis of the feedback along with performance and risk analyses revealed potential bottlenecks and reliability issues in two areas—EDF file downloading and routing of service requests through servers at distributed locations.

File Download: After query results were retrieved, Physio-MIMI provided a way for associated study files (in EDF format) to be downloaded for each of the matching study subject records. In the initial design, the files from each of the data sources were first transmitted to the Honest Broker Core and then onto VISAGE where they were compressed into a single zip archive and sent to the client's desktop. The files themselves were quite large, approximately hundreds of megabytes, and therefore file transfers were often slow, especially in situations of low network bandwidth. In addition, compressing a collection of large files on-the-fly exerted significant CPU workload on the servers. Repeated query containing overlapping records translated to redundant work in handling multiple download requests. To overcome this, a design change to eliminate the "middleman:" a mechanism using a token-based session authentication procedure was developed to allow for direct download of EDF files from the data sources to the clients. This process removed the dependency on the HB Core and VISAGE in file downloading by providing a direct, and yet secure, path between the file server and the end-user.

Service Workflow Dependency. In one embodiment, the implementation of Physio-MIMI, service requests were made through the VISAGE, the HB Core server and the HB Adapter(s) attached to data sources at various institutions. This created centralized service nodes which could make the overall system less robust. The service architecture was re-designed, eliminating the HB Core and transferring its services to VISAGE. As a result, VISAGE interacted directly with HB Adapter instances. This modified service-request routing strategy had the advantage in (a) providing a direct path between VISAGE and the various HB Adapters, and (b) allowing for the deployment of multiple instances of VISAGE servers if so desired. Multiple server instances of VISAGE, with a pre-coordinated configuration, would increase the capacity for handling large number of simultaneous query requests, allow for load-balancing and intelligent routing for data transfer by taking account of the network proximity between users and data sources.

Initially, the Meta Server component consisted of an aggregate of technologies likely needed, but there were significant lack of details translating the conception and into an implementation. VISAGE helped guiding the implementation by the desired user interfaces, with usability and user experience a priority for interface design. VISAGE, served as a galvanizing fulcrum to critically examine the relevant features of the system and to also use external feedback to further refine the model. Each and every feature of VISAGE—Query Builder, Query Manager, Query Explorer, Ontology Browser, Database to Ontology Mapper—were developed iteratively resulting in continuous prototyping, testing and demonstrating to end-users. In this sense, VISAGE provided a roadmap for agile implementation, focusing on the front-end and then drilling down to the back-end. The end result was a product that, in spite of back-end architectural changes and refinements, contained few interface overhauls.

VISAGE allows the end-user to build queries one ontological concept at a time. In one embodiment, a primitive query (e.g., "age between 40 and 45") can be generated by selecting a term (e.g., "age") from the DO browser and specifying desired constraints by dragging or clicking on the automatically generated widgets (e.g., clicking and dragging on the slider bar to highlight the interval [40, 45]). Primitive queries can be grouped, reordered, or negated. Each primitive query results in a count, and the combination of two primitive queries, (e.g., "Age between 40 and 45" AND "BMI between 39 and 42"), also results in a count. Under the hood, for this combined query, VISAGE sends the HB Adapter three abstract queries in order to obtain these three counts—one for each primitive query and one for the conjunction. Every time a user modifies any part of a query, VISAGE sends the HB Adapter abstract queries for all the subqueries all over again. In one embodiment neither VISAGE nor HB Adapter caches query results. In another embodiment, either system could cache the result of each subquery. Therefore, since a VISAGE client is typically interfaced with multiple HB Adapters, query results may be cached on the side of HB Adapters.

A Domain Ontology (DO) is created that addresses the requirements of the present Use Cases. This results in the development and elaboration of many terms (e.g., for a Sleep Domain Ontology over 400 sleep terms, over 140 medication terms and over 60 measurement units' related terms). In one embodiment, some of the terms' definitions may be quite complex and push the editing tools to their limits. In one embodiment, information regarding a device used for a measurement such as, but not limited to, blood pressure may be needed. In another embodiment, supplementing completely specified terms with common names may be needed. In another embodiment, terms are processed that are defined differently across laboratories and had changed over time. Data dictionaries often contain variables that are derived from base line data, resulting in a proliferation of terms. Proper ontological modeling (i.e., constructing a sustainable, usable domain ontology) requires more than a direct importing of existing variables from data dictionaries. In one embodiment, a lesser amount of pre-coordination has the benefit of keeping the ontological system concise, although this does require careful refactorization to ensure coverage. In another embodiment, ontological modeling may need to be guided by usability and the overall user experience.

In one embodiment, Ruby on Rails (RoR) may be chosen as the main development environment for VISAGE. However, Java and .NET may also be selected. RoR's built-in features of migration of data models, Model-View-Controller framework for database-backed web applications, convention over configuration, and seamless integration of relational databases and object-orientation, not all unique in RoR, are valuable for the agile development of a project. However, RoR's does not have the status of being as mainstream as Java and .NET, and there may be a shortage of RoR developers. In another embodiment, VISAGE may be completely recoded in Java or .NET. However, tens of thousands of applications around the world are running in RoR http://rubyonrails.org/ applications) with no sign of slowing down in its prolific use in web application development any time soon.

The following is an example of an important data type for Physio-MIMI that shows its capabilities, but is in no way a limitation on the types of data that may be used. Polysomnograms (PSGs) is an example of an important data type for Physio-MIMI since they are recordings of time series data of multiple concurrent physiological signals and thus represent a model for many other data types in medicine (e.g., electroencephalograms, electrocardiograms, actigraphy, ambulatory blood pressure, etc.) A federated approach for data integration in Physio-MIMI helps to deal with their large size (from 1 to 20 GB per recording). The value of such data for clinical research relates to the ability of the user to access and analyze the primary physiological signals and cross link these to files that contain well-defined annotations and clinical covariate data. Since existing Electronic Health Records have limited capability to accommodate the types of time series data needed to describe data phenotypes such as, but not limited to, sleep, developing improved tools for extracting relevant information from clinically available PSG reports for the purposes of characterizing patient populations for targeted study recruitment or outcome studies is useful.

The following is an example of an important data type for Physio-MIMI that shows its capabilities, but is in no way a limitation on the types of data that may be used. Access to the PSG files may be facilitated in Physio-MIMI through the following steps: (1) using VISAGE query to identify individuals within given databases that met criteria for designated analyses and who had PSG records available for downloading; (2) using newly developed EDF Application Tools to de-identify and normalize the associated EDF files downloaded through the VISAGE file links; and (3) using the Application server to assist with signal analysis of the EDF files and provide output for analysis.

In one embodiment, Physio-MIMI provides a one-stop place for (1) institutions to make available de-identified clinical data such as, but not limited to, sleep data and any other clinical data in a web-based, queriable format; (2) researchers from participating institutions to register; conduct feasibility searches; apply, secure and register IRB approvals; download analytical tools; and conduct approved studies with access to de-identified data originally collected for clinical and/or research purposes, including, but not limited to, the raw physiological polysomnography data. Investigators would have permission to perform queries and extract the de-identified data from the aggregate of data sources for the purposes of feasibility studies, data mining and outcome/quality control studies. Data would be stored in a format to enable online queries of the structured data. The results of the queries, however, would be returned to the researcher in a de-identified format, (i.e., all data within the boundaries of an institution would be identified but would be scrubbed and de-identified prior to sending it outside the institutional boundaries).

In one embodiment, preparing specific de-identified data sets available as data sources thus removing the need for dynamic de-identification was implemented to help overcome the fact that current hospital-based IRB and medical record access policies at institutions may not allow an investigator at one institution to directly query contents of another institution's clinical database.

In another embodiment, to minimize dependencies of the most restrictive regulatory processing requirements the remote data access task may be divided into two parts. An end-user should be able to get onto VISAGE, elaborate the query for their search with the user-friendly software that the project has developed, and then automatically send that query with a "data request" to a human receiver at each of several targeted institutions with databases of interest. The recipients could then—wholly internally—execute that query using VISAGE to their own databases, and return information (i.e., number of qualified subjects, etc.) to the original inquiring investigator. Transmittal of the actual data at some later point would of course require IRB approvals and inter-institutional data transfer agreements, but once established, the Physio-MIMI system would again facilitate the process by extracting the relevant data, identifying studies to be transferred, de-identifying the data, and getting them ready for what should be a simple human verification that the data are successfully de-identified. The data would then be transmitted to the original requesting investigator. The entire process should be acceptable to IRBs.

In one embodiment of Physio-MIMI, tools were developed that would facilitate standardization and de-identification of EDF files, translating vendor specific annotations to a common scheme and visualize polysomnograms or other related data. There is a desire to batch process multiple files, but in previous iterations the processing of large (100 MB+ files) may be painstakingly slow for an interactive system. Second, cross-platform testing on Windows OS may cause user interface inconsistencies with the rendering on the Mac OS system. Third, attempts to distribute the application tools to partner sites may lead to issues with software distribution versioning and licensing. In one embodiment, the entire application suite was ported to Java—essentially redeveloping the applications all over again. Java is a mature and freely available programming language suited for cross-platform applications. Its performance has been proven in many mission-critical applications. Having EDF tools developed in Java has the advantage of portability, expandability, and reusability. APIs for the tools were desirable for batch processing and are feasible options for implementation in Java.

Data sources were brought in incrementally one by one when ready to be shared. This complements well with the agile approach in rapid prototyping and iterative updates. This underscores the principle that data sources that are ready early on can be made available in earlier prototypes, and as a project progresses, more data sources becoming ready can be integrated for the testing and evaluation of a more extensive set of system features. In contrast, the Waterfall approach would be more compatible with a data warehouse framework, where a complete design and implementation of the data warehouse framework must precede the data uploading. In one embodiment, once implemented, the common data model is not meant to be frequently updated.

Physio-MIMI is a system designed to be generally applicable. There are many uses for this general applicable tool. Two of the many uses are:

In one embodiment, expanding the application scope of Physio-MIMI in two ways: (a) enhancing Physio-MIMI's domain-ontology and mapping interfaces to support systematic, incremental transformations of existing disparate data dictionaries (ranging from Neurology, Urology to Cardiology) into Physio-MIMI-style domain ontologies and facilitating the sharing and dissemination of the domainontologies through for example, but not limited to, NCBO; (b) piloting the repurpose of VISAGE by i) using it as the query interface for legacy or in-progress studies and ii) studying the cost-effectiveness of a Physio-MIMI-style federation of locally mirrored databases as an alternative institutional data warehouse model.

Accelerating the dissemination of Physio-MIMI to the larger CTSA community through (a) improved technical and user guides; (b) enhanced public web-site physiomimi.case.edu that provides access to a live demo system and blog space for sharing experiences and providing feedback; (c) regular webinars and training sessions; and (d) face-to-face workshop of an initial user community to share the experiences and develop a Physio-MIMI user group community.

In one embodiment, Physio-MIMI emphasizes end-user priority by allowing the end-user to specify a list of needs and requirements for the system. Once these requirements have been enumerated, the end-user prioritizes the list by putting the requirements that are needed most at the top of the list. As the project advances through product iterations, this list is updated and re-prioritized. Features that cover a larger scope of the project are placed into the release backlog. During each release cycle a subset of the release backlog is implemented to meet project milestones and deliverables. Features that cover a smaller scope are place in the iteration backlog, and usually represent atomic portions of the features within the release backlog.

Using the release and iteration backlog, Physio-MIMI then makes use of the next two principles of agile development. At the beginning of each iteration, an iteration planning meeting is set to assign specific features and tasks to developers. The iteration planning meeting includes both the end-users and the developers, and focuses on making sure that every developer on the team has a balanced work load for that iteration. In order to assure that no developer is overburdened, each developer fills in an estimate of how much time each task will take the developer. If the developer does not have enough time for the tasks assigned to him, the high priority items are selected first, and the rest are pushed into the following iteration. One of the important parts of agile development is that the iteration and releases do not get pushed back, and instead that the features and tasks are designed to be completed within the iteration time frame which is generally two to three weeks. In order to eliminate uneven workloads, the iteration planning meetings use the task estimates to make sure that each developer has a similar balance based on the developer's availability during the iteration timeframe. The use of the agile principles has allowed the rapid development of Physio-MIMI.

Both iteration and release planning are an important part of the agile software development cycle. Iteration planning is done at the beginning of each iteration which can last for a period of time such as, but not limited to, two to three weeks, and release planning is done at the beginning of a release cycle which can contain for example, but not limited to, two to six iterations. In one embodiment, for Physio-MIMI, Rally was used as the tool for iteration and release planning. While Rally is not the only tool that allows for agile development management, it most closely follows the workflow of the agile development process used for the Physio-MIMI project. Rally makes strong use of the agile principles and terminology. In one embodiment, an example of, but in no way is limiting, the terminology used in Rally are: product owner, delivery team, backlog, features, and tasks. Each of these terms has a corresponding link in the Physio-MIMI project.

In one embodiment, the product owner in Physio-MIMI is often the end-user who uses the services provided by Physio-MIMI. Since Physio-MIMI is divided into VISAGE and the Honest Broker Adapter, VISAGE in turn becomes an end-user of the services provided by the Honest Broker Adapter. Therefore, a lot of the development of the messaging and types of services between VISAGE and the Honest Broker Adapter were driven by needs within the VISAGE interface itself. VISAGE in turn was driven by the needs of the researchers of the system who access the underlying data via the abstract query interface.

In one embodiment, the delivery team is the team responsible for creating the functionality within the system. In Physio-MIMI, there were three primary delivery teams, the Honest Broker Adapter developers, the developers of VIS-AGE, and the domain experts in charge of developing the sleep domain ontology. These teams work closely together to create a cohesive product that was guided by the product backlog.

In one embodiment, the product backlog contains all the requirements and goals of the Physio-MIMI project that are strongly connected to the project milestones and deliverables, and release and iteration features. The product backlog is prioritized by the end-users and then features and tasks are moved into the iteration and release during the corresponding planning meetings.

In one embodiment, the features are broken into tasks by the delivery team in order to judge the time requirements of completing a feature. A feature whose tasks span multiple iterations is split into smaller features which are then completed within the iteration timelines.

One of the important features of agile software development is the ability to showcase the new features iterations at the end of the iteration. At this point, the end-user can see the features that were implemented, and either accept or reject them. This immediate feedback allows for the creation of a product that is very similar to that which is expected by the end-user. The ability to demonstrate a functioning system at the end of each iteration is a vast difference to the development cycle of the waterfall model, which puts a lot of effort into the initial requirements specification. The Rally system allows for the efficient planning and management of Physio-MIMI which contains multiple development teams at different institutions, multiple end-users, and a large two year project scope for deliverables.

In one embodiment, Ruby on Rails provides a solid framework for designing and rapidly prototyping web applications based on the Ruby programming language. The Ruby language itself is a concise pure object-oriented language that allows for generating complex code with few lines. The Ruby on Rails framework uses Convention over Configuration. Convention over Configuration is used in programming to limit the amount of code that needs to be written to accomplish a certain task. A programmer only needs to write additional code if he is trying to achieve something that is not using the convention provided by the Ruby on Rails framework. For example, the convention for a foreign key relationship in the Ruby on Rails framework expects the foreign key to be in the format tablename_id. An example comparing the simple relationship using the convention versus a programmer not using the convention is shown in Example 2.

Ruby on Rails is based on and expands the Model-View-Controller (MVC) framework. The MVC framework is used to separate the functionality of code within a web-based system architecture. The model is used to access the underlying database items and provides methods, relationships, scopes, and instantiations of the underlying data. The controller is used to route incoming web-browser messages to the appropriate actions. The view is used to generate a result for the requesting web-browser using a template with embedded Ruby. The view may pass back information to the web-server using HTML or XML.

In one embodiment, Physio-MIMI uses the Phusion Passenger gem to tightly integrate the Ruby on Rails server directly with Apache 2. Phusion Passenger is a production grade web server system that allows Apache 2 to load and serve Ruby On Rails applications. Phusion Passenger adds methods to the Apache virtual server, and it also transparently handles load balancing and server management. An example of the code displayed in Example 3 shows a sample configuration for an instance of Physio-MIMI that makes use of secure https along with url rewriting for a public instance of the Physio-MIMI wiki.

The integration allows for the use of the underlying technology already provided by Apache along with additional features provided by Phusion Passenger. The primary benefit of using Phusion Passenger is the its ability to start, stop, and restart servers dynamically and transparently without requiring additional ports to be opened, or additional server load balancing to be specified. Phusion Passenger provides a robust platform for deploying a production-ready Ruby on Rails application.

In one embodiment, the code base is stored in a GIT code repository to handle the complex requirements and specifications of Physio-MIMI. A GIT repository allows for flexible handling of requirements that are produced in an agile software development environment.

Figure 11:
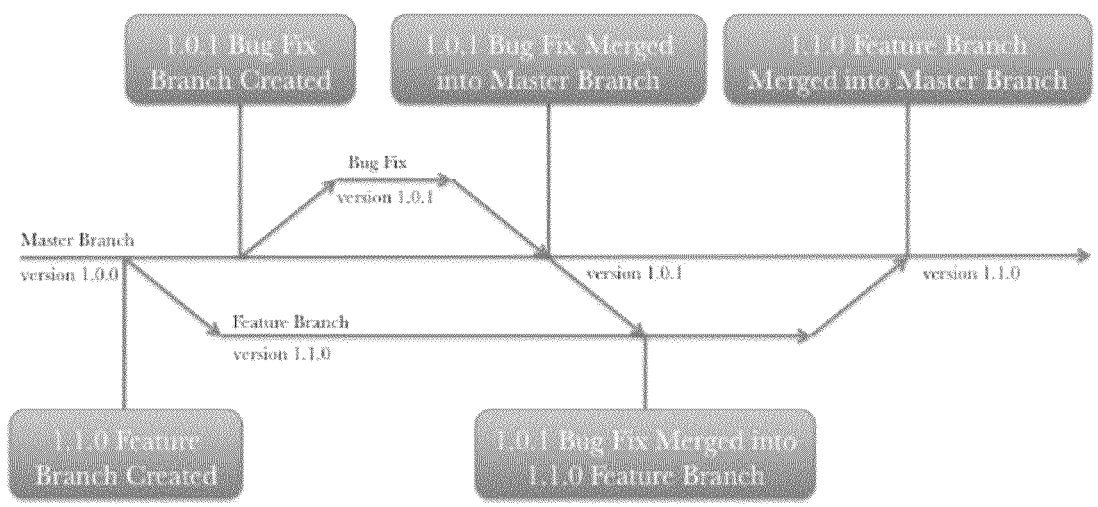
FIG. 11 illustrates a branching strategy for production environment.

GIT allows for a number of branching strategies, each of which can be used effectively in differing scenarios. The branching strategy chosen for VISAGE is flexible, easy to maintain, and has a small learning curve for new developers on the project. In the Physio-MIMI code base the master branch is responsible for the production ready code. Whenever new features for a release are generated, the source code is branched from the master branch for development. This branch is then tagged with the next release number for that branch. Once the features in this branch have been fully tested, the branch is then merged back into the master branch. The development branch is then tagged an is maintained as a development checkpoint. During the time of new feature development, an end-user may find a critical bug in the master branch. In this case, an additional bug fix branch is created from the master branch. Once the fix is in place, the bug branch is merged back into the master branch, and the development branch then pulls these changes from the master branch using a merge operation. The bug fix is merged into the development branch in order to ensure that no regression bugs are reintroduced when the feature branch is merged back with the master branch. FIG. 11 shows this process.

In one embodiment, Physio-MIMI is tested and deployed in three environments, one for development, one for quality assurance, and one for production. The development environment is on the software developer's local machine, and can switch between branches within the GIT repository. Most often, the development environment is focused on the latest development branch, or in the case of a bug fix, is focused on the bug fix branch. The quality assurance environment exists on a machine that is accessible to the developers and end-users in charge of quality assurance. The quality assurance environment is always focused on the branch that will be pushed into production with the next release. Finally, the production environment is for end-users working with real underlying data stores. The production environment is always on the master branch, and is never updated without thorough testing of a new feature within the development and quality assurance environments. Bugs found within the production environment are given high priority during iteration and release planning meetings. Therefore, in one embodiment, the GIT code repository paired with agile software development creates an environment for rapid prototyping for Physio-MIMI.

In one embodiment, we created a versioned branch solely devoted to updating the code base, developed in Ruby on Rails 2.3, to Ruby on Rails 3.0 using the branching strategy. The primary motivation behind this update is to allow Physio-MIMI to work using the latest technology. In the case of Ruby on Rails 3.0, the update provides better coding practices, easier installation of VISAGE, and a more flexible login system for VISAGE. Many of these updates also inherently reduce the lines of code required to accomplish specific tasks which creates a more readable code base for new developers.

Better coding practices are created through the emphasis on unobtrusive JavaScript in Ruby on Rails 3.0. Unobtrusive JavaScript uses the same idea presented by CSS when CSS was first created for HTML web pages. CSS presents the notion that web-page style information should be removed from the content or HTML portion of the web-page. This procedure allows for more readable source code of web-pages. This idea is then propagated to be used with JavaScript. With the event of Web 2.0 applications, JavaScript has become more heavily used within web-pages. Unobtrusive JavaScript enforces the idea that JavaScript should not be present in the content or HTML portion of the web-page. With this new coding practice in place, the content for a web-page resides in the HTML, the styling information resides in an associated CSS, and the JavaScript is stored in JS files. An example of how unobtrusive JavaScript can be used to clarify code within the HTML is shown in FIG. 12.

FIG. 12 demonstrates how the use of Unobtrusive JavaScript creates cleaner HTML documents.

In one embodiment, VISAGE is installed using the new gem bundler with the assistance of the update to Ruby on Rails 3.0. Gems are external dependencies that provide additional functionality to a Ruby on Rails project. An example of gems used within Physio-MIMI, but in no way is a limitation, provide a login system, pagination, MySQL and SQLite 3 adapters, form auto-complete functionality, and calendar date select functionality. While most of the gems are straightforward to install, a few of them, such as the MySQL and SQLite 3 gems, require compilation before being available to the Ruby on Rails project. Ruby on Rails 3.0 provides access to updated versions of these gems that are more straightforward to compile across operating systems.

In one embodiment, Ruby on Rails 3.0 offers a flexible authentication gem called Devise. Devise provides a number of authentication features such as, but not limited to, providing open authentication (OAuth2) login support, logging out users after a certain time of inactivity, functionality to reset forgotten passwords, and the ability to remember the user using a remember token.

By providing branching strategies, GIT allowed the Physio-MIMI project to be transparently upgraded to Ruby on Rails 3.0 without affecting the ability to fix bugs within the production environment. The use of Ruby on Rails 3.0 allows VISAGE to be on the front end of development, as the most active community development occurs with the latest releases of Ruby on Rails. Ruby on Rails 3.0 provides Physio-MIMI with access to this rich development environment and innovative community.

The present invention provides an apparatus and method that overcomes the many challenges associated with significant information management challenges in modern scientific research and more specifically biomedical research.

EXAMPLES

Example 1

Below is an example of MIMI's usage analysis followed by a cost-benefit analysis. The usage analysis gives a profile of MIMI's usage statistics over an 18-month period with respect to the number of users, imaging sessions, and scientific data uploads/downloads. The cost-benefit analysis demonstrates MIMI's benefits in comparison to a status quo.

Usage Analysis

Using MIMI's usage-statistics compilation capability, a usage analysis of MIMI at the Case Center for Imaging Research (CCIR) was performed. Since its initial deployment, MIMI has served approximately 150 principal investigators, collaborating investigators, and research assistants. During this period, a total of approximately 1,600 distinct sessions have been scheduled through MIMI, spanning an 18-month period or 400 working days. This translates to four scheduled sessions per working day. Among all sessions, half are linked to scientific data. This entails that imaging data have been transferred to the Data Server using MIMI's dataflow process at the frequency of two times per working day. Users also typically download the acquired data on the same day, so data downloading through the Meta Server occurs about two times per working day. This does not include data downloading activities by collaborators or repeated data downloading afterwards for various reasons. During the same period, MIMI cumulated 1.2 terabytes of fresh imaging data, which translates to a data acquisition rate of 3 gigabytes per working day.

The distribution of accrued content objects during the 18-month period of MIMI's content object and data statistics comprise a content type and size of: Registered users 150; Projects 125; Groups 120; Sessions 1,600; and Acquired images 1.2TB. With respect to the anticipated capacity, the Meta Server is expected to be able to handle over 1,000 registered users, 500 projects, 1,000 groups, and 10,000 sessions. The Data Server is designed to maintain 20 terabytes of online data.

Cost-Benefit Analysis

In addition to figuring out the intricacies behind the prior (status quo) practice, the corresponding cost estimates were gathered. A difficult part of the cost-benefit analysis involves the accurate and realistic estimation of the time spent on tasks with the status quo. We caution the reader that, although it was attempted to get as precise an estimation as possible, there are inherent reasons for some of the estimated figures to be based on rules of the thumb only.

In carrying out the cost-benefit analysis, some existing examples were followed such as Grady's analysis of an integrated telemental health care service for the military, Wang et al.'s cost-benefit analysis of electronic patient medical records, and Erdogmus' approaches of cost-benefit analysis of software development.

The cost-benefit analysis has focused on directly accountable tasks from the view of the CCIR. This is an underestimate because all the users of the MIMI system receive a fraction of similar benefits on a regular basis as well.

Financial Benefits

Three main tasks have been used for the cost-benefit analysis: scheduling, data distribution, and performance statistics compilation.

Session scheduling. The status quo procedure for scheduling imaging sessions involves three steps: 1. A researcher contacts a CCIR staff member using e-mail or phone; 2. The researcher and staff member work out an amenable time; and 3. The staff member schedules an imaging session for the researcher and sends out a notification.

Each step is further analyzed to estimate the administrative time spent for scheduling an imaging session. The first step is the responsibility of the researcher and does not occupy administrative time. During the second step of the process, the CCIR staff member communicates with the researcher and searches a calendar system for open time slots (the CCIR used Microsoft Outlook Calendar for scheduling imaging sessions). We estimate that the second step takes about 2 minutes of a staff member's administrative time. This time is obtained as the average of the estimates for phone and e-mail communication. The third step involves the entry of pertinent data into the calendar system by the staff member. We estimate that the third step uses an additional 0.5 minutes on average because a valid time slot is already determined in step two. In total, we estimate that scheduling an imaging session takes approximately 2.5 minutes of a staff member's time. Based on Usage analysis, assuming that that the CCIR averages about four imaging sessions per working day, this translates to an estimated 10 minutes of administrative time. Assuming the lower end of 260 working days per year and $18 per hour for a low-level administrative staff, the CCIR's annual cost for the low-level administrative staff would be $780. However, a low-level administrative staff cannot handle all the responsibilities of scheduling. A high-level scientific staff member with in-depth knowledge of the imaging systems is involved in final decision making to oversee scheduling management, resolve scheduling conflict and manage the data distribution. This cost is combined in the data distribution cost.

Data distribution. Based on the prior practice at CCIR, a high-level scientific staff member spends half of the time to oversee scheduling and manage data distribution based on file sharing. During a typical working day, the high-level scientific staff member is inundated with requests for rescheduling. The member must also set up user accounts for data distribution via file sharing. Users who do not have direct access to the CCIR network are an additional burden for the high-level staff member because their PCs require time-consuming updates to access the CCIR network. The staff member's salary is around $90,000, and the adjusted annual cost will be around $45,780.

Compiling performance statistics. Performance assessment and resource usage analysis is essential for justifying the continued investment and funding for a core facility. This has been a time-consuming task usually involving two steps: (1) locating relevant documents in paper or electronic format, and (2) going through the documents, extracting the pertinent information, and summarizing the performance statistics. With the status quo and based on the practice that compilation is performed on a monthly basis, this amounts to a full-time job for two administrative staff members. Assuming that that an administrative staff member's salary is approximately $36,000, the performance statistics task with the status quo incurs an annual cost of $72,000.

Using MIMI, performance statistics are compiled automatically. The administrative time needed amounts to logging into MIMI, issuing a performance summary query, and saving the results. Assuming that such queries are performed no more than several times a week, this incurs negligible time for a staff member.

Costs

The costs for using MIMI are of two kinds, nonrecurring and recurring. Nonrecurring costs include the cost for development and implementation. They also cover hardware and software costs. Recurring costs include hardware upgrades and user training. MIMI's development and implementation cost is approximately $100,000, with $50,000 for a full-time programmer, and $50,000 for a half-time supervisor for design and specification. The software cost for MIMI is $0 because MIMI is built completely on open-source software that requires neither purchasing fees nor licensing costs. MIMI also incurs a hardware cost of approximately $3,300. The hardware cost includes a primary server computer and installation fees. Assuming that the server computer is replaced every three years results in an estimated annual cost of $1,100. The estimation of the cost for user training is based on the assumption that the CCIR increases its user base by about 30 people annually. The 150 who are currently using MIMI in the final training cost were also included. It is also assumed that the annual salary of the training personnel is approximately $36,000, training personnel work 2,000 hours annually, and a training session lasts about 2 hours and trains 10 users. With these assumptions, we calculated the cost of a training session to be $36 per 10 users ($36,000 per year/2,000 hours per year×2 hours per training session), which equals about $3.60 per user. It was estimated the cost of training MIMI's initial 150 users to be $540 ($3.60 per user× 150 users). It was also determined that training 30 users per year incurs an annual cost of approximately $108 ($3.60 per user×30 users).

SUMMARY

Table 1 shows a summary of MIMI's cost-benefit analysis. The annual financial benefits and costs totals are $117,780 and $1,208, respectively. MIMI also incurs an initial total cost of $103,840. A very rough formula for the overall financial gain after a period of n years is: $F(n)=\$116572n-\$103840$.

TABLE 1

A Summary of MIMI's Cost-Benefit Analysis

| | Benefit ($) | Cost ($) | Occurs Annually |
|---|---|---|---|
| Scheduling and data distribution | 45,780.00 | — | Y |
| Performance statistics | 72,000.00 | — | Y |
| Development and implementation | — | 100,000.00 | N |
| Initial hardware | — | 3,300.00 | N |
| Hardware updates | — | 1,100.00 | Y |
| Initial training | — | 540.00 | N |
| Further training | — | 108.00 | Y |

With three specific time points as input samples for the formula, we find that foregoing the status quo methods and using MIMI over time periods of one, two, and three years yields progressive financial benefits of $12,732, $129,304, and $245,876, respectively. About one million dollars can be saved along this trajectory within 10 years. Again, this saving does not account for overhead savings provided by MIMI for the users in data transfer and sharing.

Example 2

A preliminary evaluation was performed on the efficiency of VISAGE for query construction. Three common queries with increasing levels of logical complexity on patient demographics were selected. Two expert users created the queries in both VISAGE and the i2b2 web client, respectively. The number of clicks and time needed for creating the queries were recorded and tabulated in the next table.

As can be seen from FIG. 9, VISAGE reduced time and effort (in terms of the number of clicks) to a half or nearly a third. However, this evaluation is preliminary and only looks one specific aspect of the query interface.

Example 3

An example of a simple relationship using the convention may look as follows:
  # Database Table (Column) Structures
  books.id
  chapters.id
  chapters.book_id

```
# Model Definition
class Chapter<ActiveRecord::Base
belongs_to :book
end
class Book<ActiveRecord::Base
has_many :chapters
end
```

A programmer not using this convention, and instead using the following table structures, would need to specify the foreign key explicitly.

```
# Database Table (Column) Structures
books.id
chapters.id
chapters.BOOKID
# Model Definition
class Chapter<ActiveRecord::Base
belongs_to :book, :foreign_key=>'BOOKID'
end
class Book<ActiveRecord::Base
has_many :chapters
end
```

Example 4

Below is an example of a configuration file that shows how Phusion Passenger can be integrated with an Apache virtual server.

```
# Loads the compiled passenger module for Apache
LoadModule passenger_module /usr/local/ . . . /apache2/mod_passenger.so
    PassengerRoot /usr/local/ . . . /gems/passenger-3.0.0
    PassengerRuby /usr/local/bin/ruby
    # Number of Simultaneous Servers
    PassengerMaxPoolSize 60
    # Servers Are Always On
    PassengerPoolIdleTime 0
Listen 443
<VirtualHost_default_:443>
    ServerName mimi.case.edu
    # Use Signed Certificate for Security
    SSLEngine on
    SSLCertificateFile/ . . . /cert_file.pem
    SSLCertificateKeyFile/ . . . /cert_key.pem
    # Location of the Physio-MIMI Ruby on Rails code
    DocumentRoot "/ . . . /physiomimi/public"
    RailsEnv production
    PassengerHighPerformance on
    <Directory "/ . . . /physiomimi/public">
    Order allow, deny
    Allow from all
    </Directory>
    RewriteEngine On
    # Reroute Wiki Traffic to wiki site
    RewriteRule ^/wiki(.*) http://mimi.case.edu:8080/wiki$1 [R,L]
    RewriteRule ^/public(.*) http://mimi.case.edu:8080/public$1 [R,L]
    </VirtualHost>
<VirtualHost *:80>
    ServerName mimi.case.edu
    # Reroute Incoming Insecure Connections to Secure Server
    RewriteEngine On
    RewriteCond %{HTTPS} off
    RewriteRule           (.*)           https://%{HTTP_HOST}%{REQUEST_URI}
    </VirtualHost>
```

Although the invention has been described with reference to certain embodiments detailed herein, other embodiments can achieve the same or similar results. Variations and modifications of the invention will be obvious to those skilled in the art and the invention is intended to cover all such modifications and equivalents.

What is claimed is:

1. A multi-modality, multi-resource, information integration environment system comprising:
   (a) at least one computer readable medium capable of securely storing and archiving system data;
   (b) at least one computer system, or program thereon, designed to permit and facilitate web-based access of the at least one computer readable medium containing the secured and archived system data;
   (c) at least one computer system, or program thereon, designed to permit and facilitate resource scheduling or management;
   (d) at least one computer system, or program thereon, designed to monitor the overall resource usage of a core facility; and
   (e) at least one computer system, or program thereon, designed to track regulatory and operational qualifications,
   wherein the multi-modality, multi-resource, information integration environment system achieves the following results: (i) permitting a user to access to the at least one multi-modality, multi-resource, information integration environment system to determine if a user profile exists and, if necessary, permitting a user to create a user profile if the desired user profile does not exist; (ii) assigning at least one user role to a user profile; and (iii) permitting continued access to the at least one multi-modality, multi-resource, information integration environment system based on the user profile in combination with approval from at least one manager.

2. The system of claim 1, wherein the at least one computer system, or program thereon, designed to monitor the overall resource usage of a core facility comprises compiling a profile of usage statistics of equipment and types of supported projects.

3. The system of claim 1, wherein the at least one computer system, or program thereon, is based on an open source program.

4. The system of claim 3, wherein the at least one computer system, or program thereon, is based on Plone.

5. The system of claim 1, wherein the at least one computer system, or program thereon, is based on Ruby on Rails, Java or .NET.

6. The system of claim 1, wherein the at least one computer system, or program thereon, is based on Ruby on Rails.

7. The system of claim 1, wherein at least one computer system, or a program thereon, of components (b) through (e) comprises a meta server and a data server.

8. The system of claim 7, wherein the meta server is designed to compile alphanumeric data relating to at least one of user profiles, project information, scheduling information, data storage address information, access control, or any combination of two or more thereof.

9. The system of claim 7, wherein the data server designed to store acquired data relating to at least one of image data, experimental data, or a combination thereof.

10. The system of claim 9, wherein the data server operates behind a hardware firewall with communication permitted only with the meta server.

11. The system of claim 10, wherein the meta server permits communication with at least one local area network (LAN).

12. The system of claim 1, wherein at least one computer system, or program thereon, of components (b) through (e) comprises at least one user statistics program designed to monitor resource usage and generate statements relating to resource usage.

13. A method for addressing informatics infrastructure needs of core facilities and similar research laboratories, the method comprising the steps of:
   (i) supplying at least one multi-modality, multi-resource, information integration environment system, the at least one multi-modality, multi-resource, information integration environment system comprising:
      (a) at least one computer readable medium capable of securely storing and archiving system data;
      (b) at least one computer system, or program thereon, designed to permit and facilitate web-based access of the at least one computer readable medium containing the secured and archived system data;
      (c) at least one computer system, or program thereon, designed to permit and facilitate resource scheduling or management;
      (d) at least one computer system, or program thereon, designed to monitor the overall resource usage of a core facility; and
      (e) at least one computer system, or program thereon, designed to track regulatory and operational qualifications;
   (ii) permitting a user to access to the at least one multi-modality, multi-resource, information integration environment system to determine if a user profile exists;
   (iii) permitting a user to create a user profile if the desired user profile does not exist;
   (iv) assigning at least one user role to a user profile; and
   (v) permitting continued access to the at least one multi-modality, multi-resource, information integration environment system based on the user profile in combination with approval from at least one manager.

14. The method of claim 13, wherein the at least one computer system, or program thereon, designed to monitor the overall resource usage of a core facility comprises compiling a profile of usage statistics of equipment and types of supported projects.

15. The method of claim 13, wherein the at least one computer system, or program thereon, is based on an open source program.

16. The method of claim 15, wherein the at least one computer system, or program thereon, is based on Plone.

17. The system of claim 13, wherein the at least one computer system, or program thereon, is based on Ruby on Rails, Java or .NET.

18. The system of claim 13, wherein the at least one computer system, or program thereon, is based on Ruby on Rails.

19. The method of claim 13, wherein at least one computer system, or a program thereon, of components (b) through (e) comprises a meta server and a data server.

20. The method of claim 17, wherein the meta server is designed to compile alphanumeric data relating to at least one of user profiles, project information, scheduling information, data storage address information, access control, or any combination of two or more thereof.

21. The method of claim 17, wherein the data server designed to store acquired data relating to at least one of image data, experimental data, or a combination thereof.

22. The method of claim 19, wherein the data server operates behind a hardware firewall with communication permitted only with the meta server.

23. The method of claim 20, wherein the meta server permits communication with at least one local area network (LAN).

24. The method of claim 13, wherein at least one computer system, or program thereon, of components (b) through (e) comprises at least one user statistics program designed to monitor resource usage and generate statements relating to resource usage.

25. The method of claim 13, wherein a user supplies at least one of the following pieces of information: first name, last name, e-mail address, institution, department, phone, fax, address, city, state, zip code, country, login ID, status, or any combination of two or more thereof.

26. The method of claim 13, wherein a user is assigned at least one role selected from Principal Investigator, Coinvestigator, Operator, Manager, or any combination of two or more thereof.

27. The method of claim 13, further comprising:
   (vi) permitting access by a user to data relating to at least one project, wherein the data relating to the at least one project is stored on the at least one computer readable medium capable of securely storing and archiving system data of the at least one multi-modality, multi-resource, information integration environment system.

28. The method of claim 13, wherein the at least one multi-modality, multi-resource, information integration environment system permits a user to request initial access to at least one previous un-accessed project.

* * * * *